(12) United States Patent
Shimizu et al.

(10) Patent No.: US 8,619,228 B2
(45) Date of Patent: Dec. 31, 2013

(54) LIQUID CRYSTAL DISPLAY DEVICE AND MANUFACTURING METHOD

(75) Inventors: Mie Shimizu, Tokyo (JP); Koichi Minato, Tokyo (JP); Kenzo Fukuyoshi, Tokyo (JP); Manabu Ito, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 13/443,373

(22) Filed: Apr. 10, 2012

(65) Prior Publication Data

US 2012/0262653 A1 Oct. 18, 2012

(30) Foreign Application Priority Data

Apr. 12, 2011 (JP) ................................. 2011-088274

(51) Int. Cl.
*G02F 1/1343* (2006.01)

(52) U.S. Cl.
USPC ......................................... 349/141; 349/142

(58) Field of Classification Search
USPC ................................................ 349/141–142
See application file for complete search history.

(56) References Cited

FOREIGN PATENT DOCUMENTS

| JP | 9-244046 | 9/1997 |
|---|---|---|
| JP | 2859093 | 12/1998 |
| JP | 2000-111951 | 4/2000 |
| JP | 2006-184335 | 7/2006 |
| JP | 3957430 | 5/2007 |
| JP | 2008-181139 | 8/2008 |
| JP | 2009-92815 | 4/2009 |
| JP | 4364332 | 8/2009 |
| JP | 2010-217867 | 9/2010 |
| WO | WO 2012/077376 A1 | 6/2012 |

OTHER PUBLICATIONS

Japanese Office Action mailed Jul. 23, 2013 in corresponding Japanese Application No. 2011-088274.

*Primary Examiner* — Phu Vu

(57) ABSTRACT

A liquid crystal display device includes an array substrate and a counter substrate that face each other with a liquid crystal layer therebetween. The array substrate includes a first electrode, a second electrode, and an alignment sustaining layer. The first electrode has a comb-teeth shape. The second electrode has a comb-teeth shape, faces the first electrode, and includes a protruding portion protruding from the first electrode in a direction where comb teeth are arranged. The alignment sustaining layer is formed above a surface of the array substrate being in contact with the liquid crystal layer and gives liquid crystals a pre-tilt to a direction in which the second electrode protrudes from the first electrode, in a direction in which the comb teeth are arranged.

17 Claims, 15 Drawing Sheets

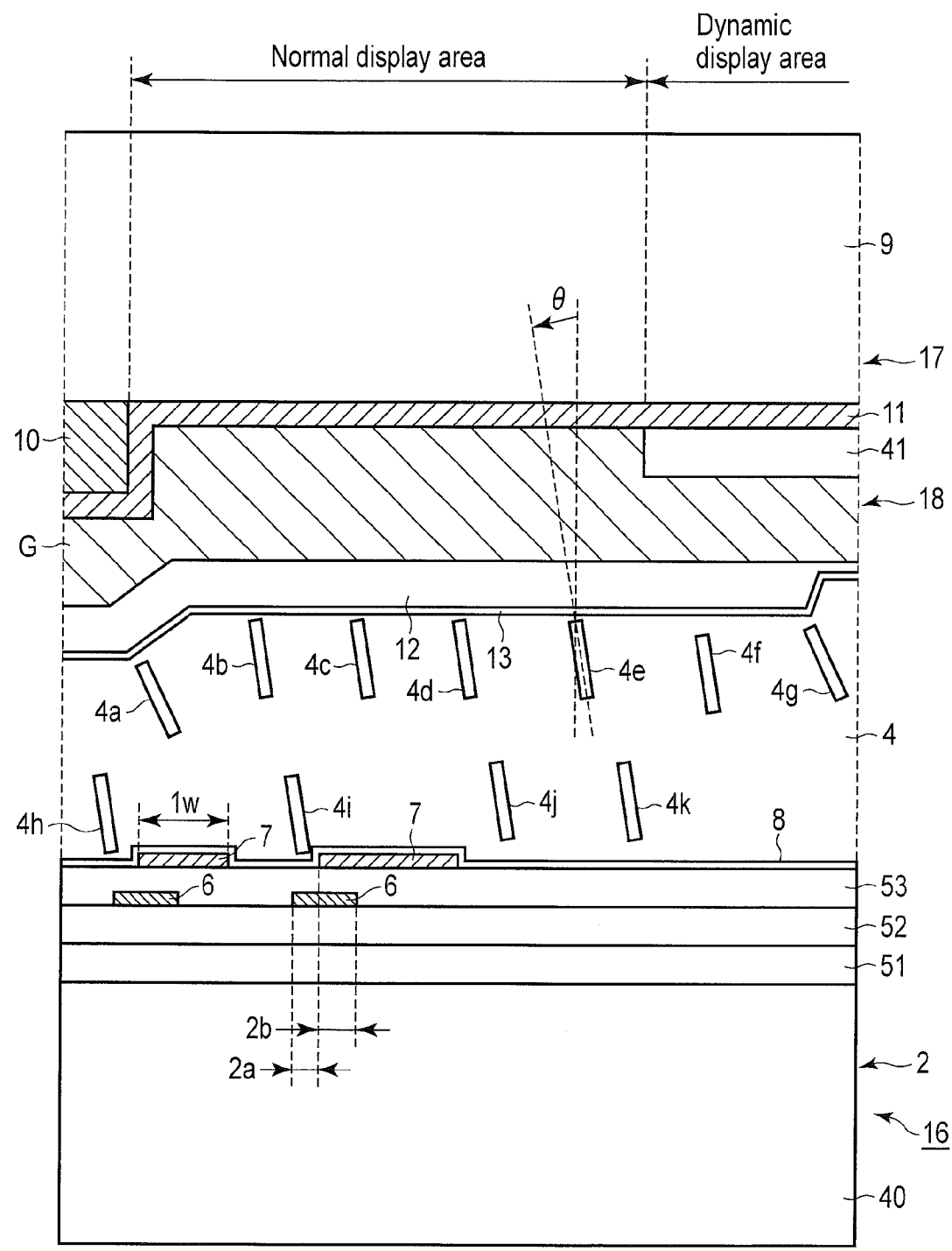
F I G. 4

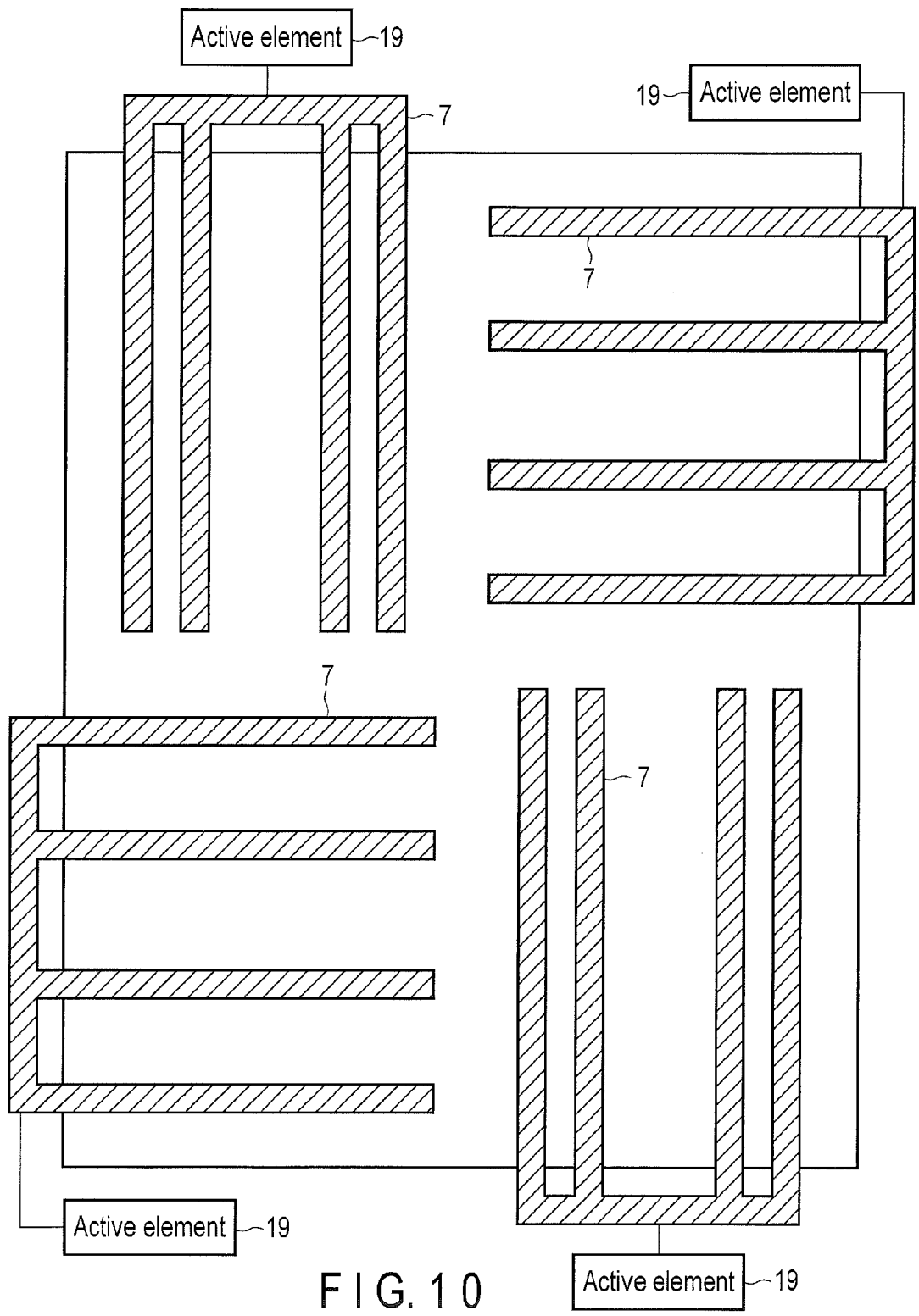
F I G. 1 0

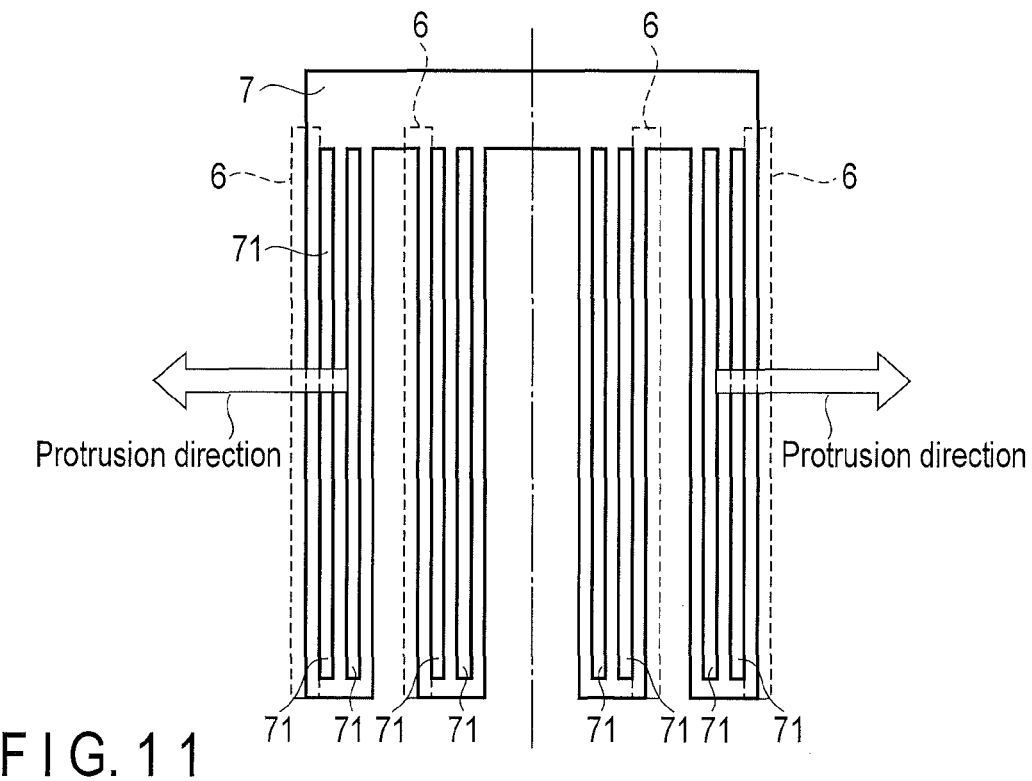
F I G. 1 1
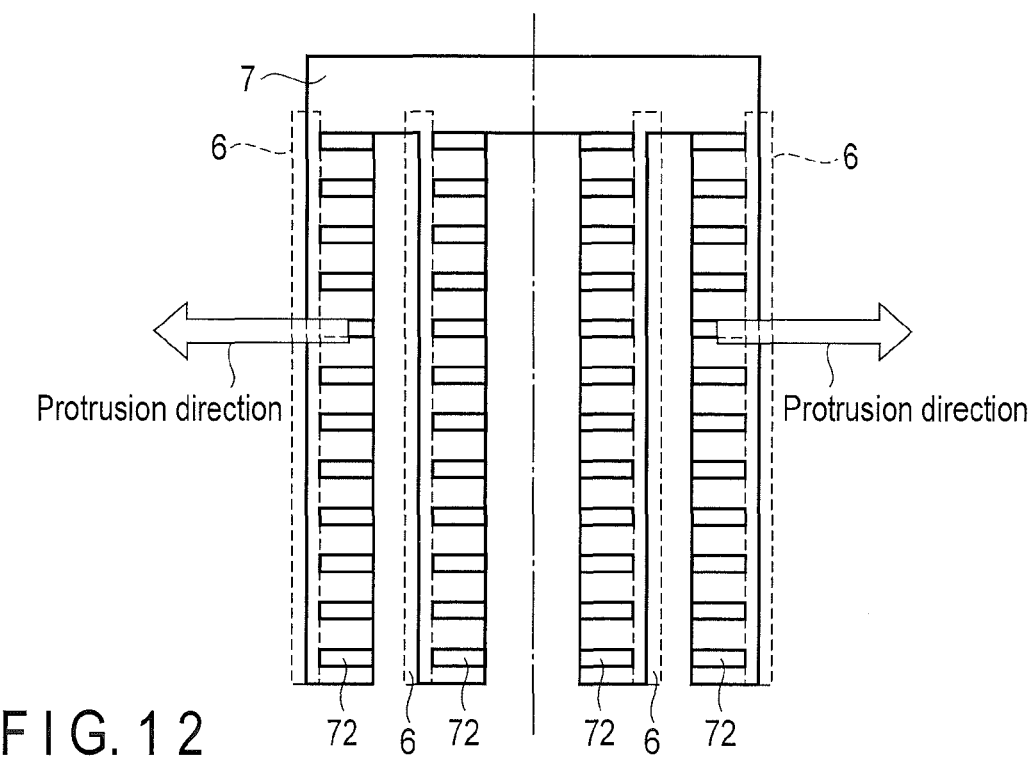
F I G. 1 2

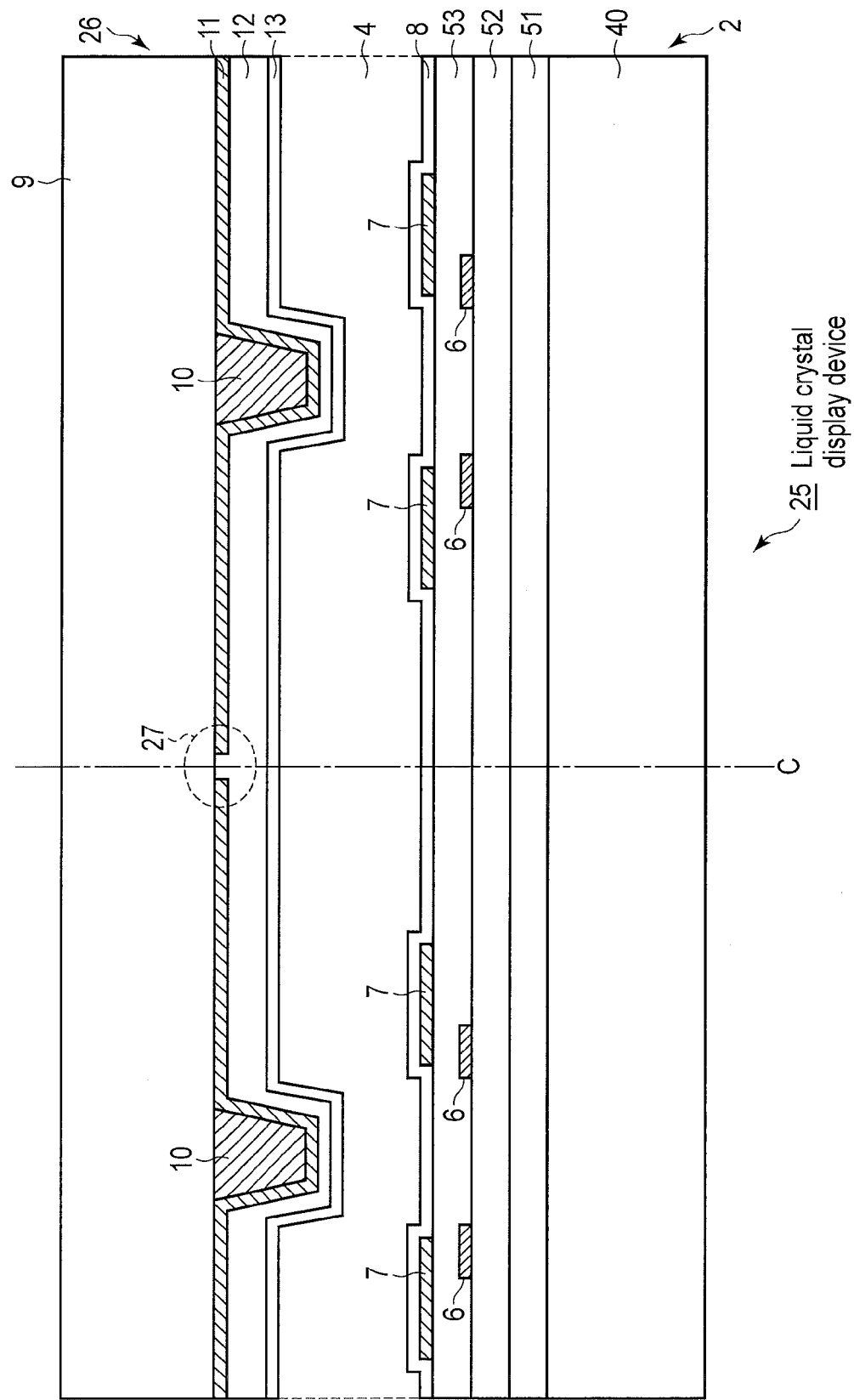
F I G. 15

LIQUID CRYSTAL DISPLAY DEVICE AND MANUFACTURING METHOD

CROSS-REFERENCE TO RELATED APPLICATIONS

This application is based upon and claims the benefit of priority from prior Japanese Patent Application No. 2011-088274, filed Apr. 12, 2011, the entire contents of which are incorporated herein by reference.

BACKGROUND OF THE INVENTION

1. Field of the Invention

The present invention relates to a liquid crystal display device and a method of manufacturing the same.

2. Description of the Related Art

Recently, regarding a thin display device such as a liquid crystal display device, there is a demand for a high image quality, price cutting, and power saving. Regarding a color filter for the liquid crystal display device, there is a need to be improved in order to achieve a high image quality, such as sufficient chromatic purity, high contrast, smoothness (flatness), and the like.

As to the liquid crystal display device, alignment methods of liquid crystals, such as Vertically Alignment (VA), Hybrid-aligned Nematic (HAN), Twisted Nematic (TN), Optically Compensated Bend (OCB), and Continuous Pinwheel Alignment (CPA), and driving methods of the liquid crystals are proposed for a high image quality. With these technologies, the liquid crystal display devices having a wide viewing angle and a high-speed response have been put to practical use.

In the VA system, a variety of improved modes have been developed, for example Multi-Domain Vertically Alignment (MVA), Patterned Vertically Alignment (PVA), Vertically Alignment Electrically Controlled Birefringence (VAECB), Vertical Alignment Hybrid-aligned Nematic (VAHAN), and Vertically Alignment Twisted Nematic (VATN). Moreover, in the longitudinal electric field type liquid crystal display device of the VA system or the like in which a driving voltage is applied in the direction of thickness of the liquid crystal layer, a rapider liquid crystal response, a wide viewing angle technology, and higher transmittance are demanded.

The liquid crystal molecules are initially aligned to be perpendicular to the surface of a substrate and it is difficult to determine the inclination direction of the liquid crystal molecules at the time when a voltage is applied. Therefore, in the MVA technology, in order to remove the problem in which the vertically aligned liquid crystal molecules become unstable at the time when a driving voltage of the liquid crystal is applied, a plurality of rib-shaped convex portions are provided, and a plurality of liquid crystal domains are formed such that each domain has an alignment direction different from each other between the ribs, which leads to a wide viewing angle.

Patent Literature 1 (Japanese Patent No. 3957430) discloses a technology in which the liquid crystal domains are formed by using first and second alignment control structures (ribs).

Patent Literature 2 (Jpn. Pat. Appln. KOKAI Publication No. 2008-181139) discloses a technology in which four liquid crystal domains are formed by using an optical alignment method. In Patent Literature 2, it is described that, in each liquid crystal domain, aligning processing related to the strict control on a pre-tilt angle (89 degrees from the horizontal direction) are necessarily performed multiple times (four times) to secure a wide viewing angle, and alignment axes at an angle of 90 degrees from each other are necessary.

Patent Literature 3 (Japanese Patent No. 2859093) and Patent Literature 4 (Japanese Patent No. 4364332) disclose a technology in which vertically aligned liquid crystal molecules are controlled with an oblique electric field by using a first electrode (hereinafter, also referred to as a counter electrode, a transparent electrode, a display electrode, or a common electrode on a color filter side) which is formed of a transparent conductive film on a color filter substrate side, and also using a first electrode (also, referred to as a pixel electrode) and a second electrode (also, referred to as a common electrode on an array substrate side) which are formed on the array substrate side. In Patent Literature 3, it is described that liquid crystal with negative dielectric anisotropy is used, and in Patent Literature 4, it is described that the liquid crystal with positive dielectric anisotropy is used. In Patent Literature 4, there is no description about the liquid crystal with negative dielectric anisotropy.

In the basic configuration of the liquid crystal display device of the VA system, the TN system, or the like, a liquid crystal layer is interposed between a color filter substrate with a third electrode and an array substrate with a plurality of first electrodes that are provided for driving liquid crystal. For instance, the first electrode is a transparent electrode that is electrically connected with a thin film transistor (TFT) element and is formed in a comb-teeth shape pattern. In this typical configuration, a driving voltage is applied between the third electrode on the color filter and the first electrodes formed on the array substrate side, and the liquid crystal is driven by application of this driving voltage. The transparent conductive film that forms the first electrodes and the third electrode are usually a thin film made of a conductive metallic oxide such as Indium Tin Oxide (ITO: a metallic oxide thin film of indium tin) or Indium Zinc Oxide (IZO).

Patent Literature 5 (Jpn. Pat. Appln. KOKAI Publication No. 2009-92815) discloses a liquid crystal display device that uses a pair of substrates with different pre-tilt angles.

Patent Literature 6 (Jpn. Pat. Appln. KOKAI Publication No. 2010-217867) describes an aligning agent used for an alignment film.

As described above, in the MVA technology applied to the liquid crystal display device of the vertical alignment system, the liquid crystal domain is formed by using the alignment control structure called a rib (or ribs) to secure a wide viewing angle. When the liquid crystal molecules have negative dielectric anisotropy, the liquid crystal molecules located between two ribs structures made of a resin formed on the color filter or the like are aligned perpendicular to the surface of a substrate before application of a driving voltage, and tend to incline horizontally in a perpendicular direction to the two ribs during the application of the driving voltage. However, although the voltage is applied, the inclining directions of the liquid crystal molecules at the center of a space between the two ribs are not determined to be equal, but the liquid crystal molecules are aligned in a spray alignment or a bend alignment. The disturbance of liquid crystal molecular alignment leads to the roughness in liquid crystal display, display irregularity, and deterioration of transmittance.

Moreover, in the case of MVA system, it is difficult to finely control the inclination of the liquid crystal molecules with the driving voltage, and to control the halftone display. Particularly, in the MVA system, the linearity in the relation between the display (response speed) and the driving voltage is low, and it is difficult to display the halftone with a low driving voltage.

As a technique of improving the halftone display, as disclosed in Patent Literature 3 and Patent Literature 4, a technique that controls the liquid-crystal molecular alignment with a method of using the oblique electric field by using first, second and third electrodes is effective. In the method of using the oblique electric field, the inclining direction of the liquid crystal molecules can be set. Moreover, with the method of using the oblique electric field, the inclining amount of the liquid crystal molecules can be easily controlled, and the halftone display can be controlled effectively.

However, even if the oblique electric field method is used, measures to resolve disclination of the liquid crystal might not be sufficient. Disclination means occurrence of an event that a pixel has areas where the transmittance of light is different due to the unintended alignment disturbance or non-alignment of the liquid crystals.

Patent Literature 3 discloses that the disclination at the center of the pixel is fixed by providing an alignment control window where the transparent conductive film is not present in the third electrode at the center of the pixel. However, Patent Literature 3 does not disclose a method of resolving the disclination at the periphery of the pixel. Moreover, though the disclination can be fixed at the center of the pixel, a method of minimizing the disclination is not disclosed. In addition, a technology which improves the response of the liquid crystal is not discussed.

In Patent Literature 4, a dielectric layer is stacked on a transparent conductive film (transparent electrode). Accordingly, the effect of the oblique electric field method is increased, so the technology is preferable. However, as illustrated in FIG. 7 of Patent Literature 4, the liquid crystals of the vertical alignment might remain at the center of the pixel and the edge of the pixel even after the voltage is applied, which sometimes lead to decreases in transmittance and aperture ratio. In Patent Literature 4, the liquid crystal with negative dielectric anisotropy is not discussed. When the liquid crystal with positive dielectric anisotropy is used, it is difficult to improve the transmittance due to the disclination at the center of the pixel. Therefore, it is difficult to adopt the technology of Patent Literature 4 in a transflective liquid crystal display device.

Patent Literature 5 discloses a liquid crystal display device using a pair of substrates with different pre-tilt angles. In Patent Literature 5 (especially, claim 4, FIG. 3, and Paragraph 0024, and the like), a so-called Polymer Sustained Alignment (PSA) technology is disclosed which adds a monomer, which is polymerized with ultraviolet light irradiation, to a liquid crystal layer to cause the liquid crystal layer to turn into liquid crystal cells, and irradiates the ultraviolet light while applying a voltage to form an aligned film. Moreover, in Paragraph 0035 of Patent Literature 5, it is disclosed that the pre-tilt angle given to the liquid crystal molecules on the TFT substrate side is set to 1° or greater and 4° or less from the perpendicular direction to the substrate, and the pre-tilt angle in the color filter substrate side is 0°. Moreover, in Paragraph 0048 of Patent Literature 5, a configuration of a color filter is disclosed in which an ITO electrode is arranged in the color filter, and a vertical alignment film is further coated thereon. In FIGS. 4 to 6, and Paragraph 0022 of Patent Literature 5, a sectional configuration of a pixel is disclosed.

However, Patent Literature 5 does not disclose a technology in which domains of 2 or 4 liquid-crystal molecular alignments are formed in a unit pixel (one pixel) of a liquid crystal display device, and the liquid crystal molecules are arranged in one direction in one domain. When the liquid crystal molecules are homogeneously aligned in one domain, it is difficult to secure high transmittance in the liquid crystal display device. With the liquid crystal arrangement in FIGS. 4 to 6 of Patent Literature 5, it is difficult to achieve high transmittance because the alignments of the liquid crystal molecules in the unit pixel are not uniform. In Paragraph 0031 of Patent Literature 5, even though the ultraviolet light is irradiated from the color filter substrate side, the transmittance for the ultraviolet light is different among red, green, blue, and the like of the color filters. Therefore, there might be a difference in the pre-tilt angle of the liquid crystal among different colors, which may result in a difference in the response of the liquid crystal among different colors. In addition, in Patent Literature 5, the following are not discussed: a TFT light-shielding unit, a black matrix of the color filter, the presence of a monomer which is left unpolymerized due to the blocking of the ultraviolet ray in the pixels with low transmittance for the ultraviolet ray, the decrease in reliability of the alignment film attributable to insufficient curing. In the PSA technique which adds a photopolymerizable monomer to the liquid crystal for causing optical polymerization, a change in the liquid crystal response or an image sticking occurs over time due to the presence of the monomer which remains unpolymerized, or the insufficiently cured alignment film.

BRIEF SUMMARY OF THE INVENTION

In the first aspect, a liquid crystal display device includes an array substrate and a counter substrate that face each other with a liquid crystal layer therebetween. The array substrate includes a first electrode, second electrode and an alignment sustaining layer. The first electrode has a comb-teeth shape and is electrically connected with an active element. The second electrode has a comb-teeth shape, faces the first electrode with an insulating layer therebetween, and includes a protruding portion protruding from the first electrode in a direction where comb teeth are arranged. The alignment sustaining layer is formed above a surface of the array substrate being in contact with the liquid crystal layer and gives liquid crystals a pre-tilt to a direction in which the second electrode protrudes from the first electrode, in a direction in which the comb teeth are arranged. The counter substrate includes a third electrode with a voltage being applied between the third electrode and the first electrode during liquid crystal driving.

The second aspect relates to manufacture of a liquid crystal display device including an array substrate, and a counter substrate with a liquid crystal layer interposed therebetween. The array substrate includes a first electrode having a comb-teeth shape and being electrically connected to an active element. The second electrode faces the first electrode with an insulating layer therebetween. The alignment film is formed above a surface of the array substrate being in contact with the liquid crystal layer. The counter electrode includes a third electrode with a voltage being applied between the third electrode and the first electrode during liquid crystal driving. The method includes applying a voltage to at least one of the first to third electrodes, irradiating light from a surface of the array substrate that is not in contact with the liquid crystal layer, and generating an alignment sustaining layer that gives liquid crystals a pre-tilt to a direction in which the second electrode protrudes from the first electrode, in a direction in which comb teeth of the first electrode are arranged, with the alignment film.

BRIEF DESCRIPTION OF THE SEVERAL VIEWS OF THE DRAWING

FIG. 4 is a partial cross-sectional view that illustrates an example of the liquid crystal display device according to a first embodiment in which liquid crystals are given a pre-tilt angle;

FIG. 10 is a plan view illustrating an example of a plurality of first electrodes and a plurality of active elements provided in the unit sub-pixel or the unit pixel;

FIG. 11 is a plan view illustrating a first example of flaw lines formed above a surface of the first electrode on the liquid crystal side;

FIG. 12 is a plan view illustrating a second example of flaw lines formed above the surface of the first electrode on the liquid crystal side;

FIG. 15 is a partial cross-sectional view illustrating an example of a configuration of a liquid crystal display device according to a eighth embodiment.

DETAILED DESCRIPTION OF THE INVENTION

Hereafter, embodiments of the present invention are described with reference to the drawings. In the following description, the same or substantially same functions and configuration components are denoted by the same reference symbols, and thus the description thereabout will be given, if necessary.

In the following embodiments, only characteristic portions will be described, and portions not different from general configuration components will not be described.

In the following embodiments, it is assumed that the unit of the display of a single color of a liquid crystal display device is a sub-pixel or a pixel.

First Embodiment

In this embodiment, a liquid crystal display device of an oblique electric field system is described which reduces disclination to achieve a bright display, and is excellent in response and halftone display.

A pre-tilt angle is assumed to be an angle from a direction perpendicular to the surface of a substrate in this embodiment to be described below. For instance, the pre-tile angle of a perpendicular direction to the surface of the substrate is 0°.

Figure 1:
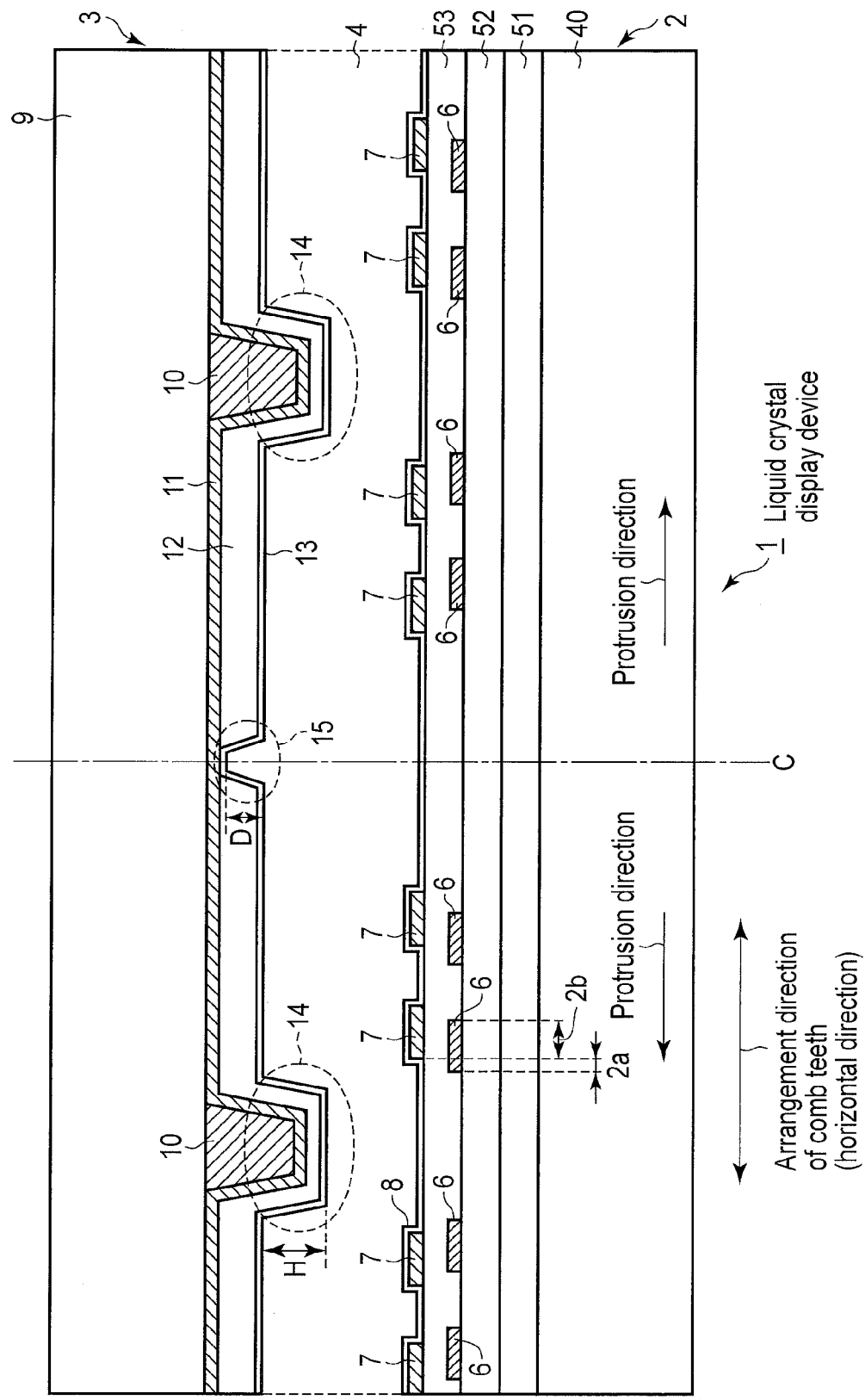
FIG. 1 is a partial cross-sectional view that illustrates an example of a configuration of a liquid crystal display device according to a first embodiment.

FIG. 1 is a partial cross-sectional view that illustrates an example of a configuration of a liquid crystal display device according to the present embodiment. FIG. 1 illustrates a cross section perpendicular to an axis of a comb-teeth portion of a first electrode (linear conductor) and to an axis of a comb-teeth portion of a second electrode.

A liquid crystal display device 1 of the oblique electric field type has a configuration in which an array substrate 2 and a counter substrate 3 are joined together with a liquid crystal layer 4 interposed therebetween.

An array substrate 2 is configured by sequentially forming insulating layers 51 and 52, a second electrode 6, an insulating layer 53, a first electrode 7, and an alignment sustaining layer 8 (alignment film) above a transparent substrate 40 on which active elements (liquid crystal drive elements) such as TFTs or the like are formed. Specifically, the array substrate 2 includes the insulating layer 51 and the insulating layer 52 above the transparent substrate 2, and includes the second electrode 6 having a comb-teeth shape above the insulating layer 52. In addition, the array substrate 2 includes the insulating layer 53 above the insulating layer 52 in which the second electrode 6 is formed. The array substrate 2 includes the first electrode 7 having a comb-teeth shape above the insulating layer 53. And, the array substrate 2 includes the alignment sustaining layer 8 above the first electrode 7 of a comb-teeth shape, and the insulating layer 53.

The counter substrate 3 is configured by sequentially forming a black matrix 10, a third electrode 11 which is a transparent conductive film, a transparent resin layer 12, and an alignment sustaining layer 13 above a transparent substrate 9. In FIG. 1, the alignment sustaining layer 13 side of the counter substrate 3 is in contact with the liquid crystal layer 4.

For instance, a glass substrate or the like is used as the transparent substrate 9. The black matrix 10 is formed by segmenting the plane (surface, or upper surface) of the transparent substrate 9 into two or more open regions (sub-pixel areas or pixel areas). In a plan view shape of the open region, the open region has a polygonal shape where respective opposing sides are parallel to each other. As the polygonal shape, for instance, a square, a rectangle, a parallelogram, and a bending form "<" (a letter V shape or a boomerang shape), or the like may be used. The third electrode 11 is formed to cover the plane of the transparent substrate 9 with the black matrix 10 formed thereon. The transparent conductive film is used as the third electrode 11. The transparent resin layer 12 is formed above the third electrode 11. The transparent resin layer 12 protrudes at an overlapping point of the transparent resin layer 12 and the black matrix 10, and is recessed at the central line portion of the open region. In addition, the alignment sustaining layer 13 is formed above the transparent resin layer 12. The surface of the counter substrate 3 on the alignment sustaining layer 13 side has a convex portion 14 (an overlay portion) that protrudes at a position where the black matrix 10 is formed, and has a concave portion 15 that is recessed at a central line portion.

The black matrix 10 is a light-shielding pattern that is provided at a periphery of the unit sub-pixel or the unit pixel, or two sides of a periphery of unit sub-pixels or unit pixels that are opposite to each other in order to improve the contrast of the liquid crystal display. The light-shielding layer is a coating film that is formed of a transparent resin with light shielding pigments dispersed therein. The light-shielding layer is a light sensitive coating film which has photo sensitivity and is patterned using a photolithography method including exposure and development processes.

The unit sub-pixel or the unit pixel corresponds to the open region of the black matrix 10. The pixel is synonymous with a picture element.

The alignment sustaining layers 8 and 13 are alignment films which have been subjected to an aligning process. In the aligning process, the array substrate 2, the counter substrate 3, and the liquid crystal layer 4 are combined and then segmented into liquid crystal cells. Then, in such a state, electromagnetic wave such as light is irradiated to a vertical alignment film while a voltage (for instance, an alternating current voltage or a direct current voltage of from 1V to 10V) is applied to liquid crystals, so that the liquid crystals are imparted with a pre-tilt angle. The light irradiated in the aligning process may be either polarized light or unpolarized light. The second electrode 6 of a comb-teeth shape includes an extension portion (protrusion portion) 2a, that extends from the first electrode 7 in the unit sub-pixel or the unit pixel at the position in an arrangement direction of the comb-teeth portion (hereafter, referred to as horizontal direction) in FIG. 1. An inclination direction of the liquid crystals can be determined by applying a voltage between the first electrode 7 and the second electrode 6 which shift (deviate) from each other in the position in the horizontal direction. Therefore, in the present embodiment, it is preferable that the pre-tilt angle achieved by using the alignment sustaining layers 8 and 13 be minute. Therefore, the unpolarized light that can increase the amount of exposure may be used for an aligning process.

In FIG. 1, the alignment sustaining layer 8 of the array substrate 2 and the alignment sustaining layer 13 of the counter substrate 3 face each other with the liquid crystal layer 4 therebetween. That is, the alignment sustaining layers 8 and 13 are formed above respective surfaces of the array substrate 2 and the counter substrate 3 which are in contact with the liquid crystal layer 4. For instance, the alignment sustaining layers 8 and 13 are assumed to have a film thickness of about 60 nm.

In the surface of the side of the alignment sustaining layer 13 of the counter substrate 3, a portion where the alignment sustaining layer 13 overlaps the black matrix 10 protrude, so a convex portion 14 are formed.

In the surface of the side of the alignment sustaining layer 13 of the counter substrate 3, a centerline portion of the open region provided by the black matrix 10 is recessed, so that a concave portion 15 is formed.

In FIG. 1, since a polarizing plate, a retardation plate, and the like are formed as typical structures, a description thereof will not be given. The liquid crystal display device 1 may includes one to three retardation plates which is attached to the polarizing plate.

The operation and the effect of the liquid crystal display device having the configuration described above will be described.

In the liquid crystal display device according to the present embodiment, the alignment sustaining layer of the array substrate with the counter electrode formed therein, and the alignment sustaining layer of the array substrate with the liquid crystal drive elements formed therein are aligned to face each other, and the liquid crystal layer is interposed therebetween.

When the liquid crystal is driven, there is a potential difference between the first electrode 7 and the second electrode 6 of the array substrate 2 and between the first electrode 7 of the array substrate 2 and third electrodes 11 of the counter substrate 3. In this embodiment, the oblique electric field caused among the electrodes 6, 7, and 11 is used for driving the liquid crystal.

Both of the first electrode 7 and the second electrode 6 have a comb-teeth shape pattern. The comb-teeth shape pattern is formed by electrically connecting two or more comb-teeth portions (linear conductors), each with a width of about 2 µm to 40 µm, to a connection portion. The connection portion is formed on one side or both sides of the comb-teeth portion. It is desirable that the connection portion is arranged in the liquid crystal display device 1 at a position where the open region is not formed. The interval of the comb-teeth portions having a comb-teeth shape pattern is selected within a range from about 3 µm to 100 µm according to liquid crystal cell conditions and liquid crystal materials. The density and the pitch of the comp-teeth portions, and the width of the electrode may change in the unit sub-pixel or the unit pixel. In the horizontal direction in FIG. 1, the second electrode 6 further extends than (protrudes from) the first electrode 7 in a direction from the center C of the cross section to the black matrix 10 in the unit sub-pixel or the unit pixel. The extension amount can be adjusted arbitrarily according to liquid crystal materials, drive conditions and the dimensions such as the thickness and the like of the liquid crystal layer 4. As the extension amount of the extension portion 2a of the second electrode 6, a small amount such as 1 µm to 6 µm is sufficient. An overlapping portion 2b of the first electrode 7 and the second electrode 6 may be used as an auxiliary capacitor related to the driving of the liquid crystal.

The alignment sustaining layers 8 and 13 are organic films formed directly on or indirectly on the electrodes 6, 7, and 13 in the array substrate 2 and the counter substrate 3. The alignment sustaining layers 8 and 13 are formed at the position where the alignment sustaining layers 8 and 13 are in contact with the liquid crystal layer 4. The alignment sustaining layers 8 and 13 are formed by imparting the function of pre-tilting the liquid crystal to the alignment film which aligns the liquid crystal in the vertical direction by using radiation such as light beams or heat beams, or radiation given under electric field. Ultraviolet rays may be used as the radiation. The pre-tilt formation function of the alignment sustaining layers 8 and 13 formed above a flat portion within the unit sub-pixel or the unit pixel practically imparts the liquid crystal the pre-tilt angle within the range of 0.1° to 1.5° and more preferably within the range of 0.1° to 1°. The liquid crystal display device 1 can smoothly drive the liquid crystal molecules in the liquid crystal layer 4 even at a minute pre-tilt angle of less than 1° because the oblique electric field is used. In the normally black vertical arrangement liquid crystal, as the pre-tilt angle given by the alignment sustaining layers 8 and 13 decreases, an optical leakage during the display of a black color decreases and thus contrast may increase. However, in general, in the vertical alignment liquid crystal with a small tilt-angle, the liquid crystal drive voltage on the low voltage side usually increases, and therefore the reproducibility of the display from the black to the halftone may decrease.

However, when alignment sustaining layers 8 and 13 according to the present embodiment are used, the halftone display with a fast liquid crystal response can be performed at the low voltage even at a minute pre-tilt angle. Additionally, a reduction in power consumption can be achieved by the driving at the low voltage. In addition the pre-tilt angle refers to an inclination angle of a long axis direction of an oval of a liquid crystal molecule to the normal line of the substrate surface during no application of the liquid crystal drive voltage. The pre-tilt angle of the vertical alignment liquid crystal tends to decrease the contrast because of an optical leakage when it becomes greater than 1.5°, and therefore it is preferable that the pre-tilt angle be small in terms of the contrast.

In the present embodiment, liquid crystal with negative dielectric anisotropy will be described, but the operation thereof is similar to the case of using the liquid crystal with positive dielectric anisotropy. As for the liquid crystal with positive dielectric anisotropy, the liquid crystal molecules are horizontally arranged in an initial state, and then stand up from the substrate surface when the driving voltage is applied. When the liquid crystal has positive dielectric anisotropy, it is necessary to impart a horizontal aligning function to the alignment sustaining layers 8 and 13. When forming the pre-tilt angle with a photosensitive alignment film, the exposure amount is generally increased to increase the pre-tilt angle. The oblique electric field system like the liquid crystal display device 1 according to the present embodiment is advantageous compared with the vertical electric field system because the liquid crystal can be driven at a low voltage. Furthermore, since a process of imparting an alignment function of a slight pre-tilt angle such as less than 1° is satisfactorily used, the alignment process is simple. For instance, as the liquid crystal with negative dielectric anisotropy, nematic liquid crystal having a birefringence of about 0.1 at about the room temperature may be used. The thickness of the liquid crystal layer 4 needs not be especially limited. However, the thickness Δnd of the liquid crystal layer 4 that can be practically used in the present embodiment may be in the range of 300 nm to 500 nm. As the alignment film before the alignment process is performed for forming the alignment sustaining layers 8 and 13, for example, a material containing photosensitive polyorganosiloxane or the photosensitive polyorganosiloxane, and a polymer such as polyamic acid or polyimide may be used. Alternatively, a siloxane-based polymer represented by siloxanecinamate may be used. Further alternatively, a coating film of photosensitive polyimide, a photosensitive polymeric liquid crystal material, or the like may be used. Moreover, as the alignment film, an optical alignment film using an azobenzene derivative or an optical alignment film containing polyamic acid with a triple bond on a main chain may be used. Moreover, for instance, the pre-tilt angle can be measured by the crystal rotation or the like described in Journal of Applied Physics, Vol. 48, No. 5, p. 1783-1792 (1977).

The alignment sustaining layer 8 (the alignment sustaining layer 13, if necessary) according to the present embodiment is a layer with a minute pre-tilt angle obtained by performing an optical alignment process on the vertical alignment film (with a pre-tilt angle of 0°) in the presence of the electric field. As the alignment films for the alignment sustaining layers 8 and 13, for example, the aligning agent disclosed in Patent Literature 6 may be used.

When a channel of a TFT is formed of a transparent oxide semiconductor which is transparent to visible light rays, a thin line width of a pattern of a light-shielding layer such as the black matrix 10 is allowed, so that the brightness of the liquid crystal display device 1 may be improved. In this embodiment, an oxide semiconductor TFT may be used to efficiently perform the optical alignment and improve the reliability of the liquid crystal display device 1. The conventional PSA technology uses the liquid crystal added with a photopolymerizable monomer. Accordingly, due to the TFT light-shielding portion having a large area which is related to a silicon semiconductor, the black matrix in the color filter layer, the monomer which is left unpolymerized due to the blocking of the ultraviolet ray in the color filter with low transmittance for the ultraviolet rays, or the insufficiently cured alignment film, the reliability of the liquid crystal display device may decrease. However, in the liquid crystal display device 1 according to this embodiment, the light-shielding area is reduced so that the exposure is done over a large area, and moreover photopolymerizable monomers are not used. Accordingly, the reliability can be greatly improved. The silicon semiconductor TFT is sensitive to visible rays unlike such an oxide semiconductor TFT, so that it is necessary to shield the TFTs over a large area with the light-shielding layer such as the black matrix 10.

As the oxide semiconductor, a complex metal-oxide that is transparent to visible rays can be used. The semiconductor material where the metal-oxide is a main component is an oxide containing at least two or more elements of zinc, indium, tin, tungsten, magnesium, and gallium. For example, a zinc oxide, an indium oxide, an indium zinc oxide, a tin oxide, a tungsten oxide (WO), an indium zinc gallium oxide (In—Ga—Zn—O), an indium gallium oxide (In—Ga—O), a zinc tin oxide (Zn—Sn—O), a zinc silicon tin oxide (Zn—Sn—Si—O), or the like may be used as a material. Alternatively, other materials may be used. These materials are substantially transparent and have a band gap of 2.8 eV or more, and preferably a band gap of 3.2 eV or more. The structure of these materials may be any of monocrystal, polycrystal, microcrystal, mixed crystal of crystal and amorphous, nanocrystal-dispersed amorphous, and amorphous. It is preferable that the film thickness of the oxide semiconductor layer be 10 nm or more. The oxide semiconductor layer may be formed by using various methods such as a sputtering method, a pulsed laser deposition method, a vacuum evaporation method, a Chemical Vapor Deposition (CVD) method, a Molecular Beam Epitaxy (MBE) method, an inkjet method, a printing method, and the like. Preferably, the oxide semiconductor layer is formed with a sputtering method, a pulsed laser deposition method, a vacuum evaporation method, an inkjet method, and a printing method. As the sputtering method, an RF magnetron sputtering method or a DC sputtering method may be used, but the DC sputtering method is preferable. As a starting material (target material) for the sputtering, ceramic oxide materials or metallic target materials may be used. As for the vacuum evaporation, heating vapor deposition, electron beam deposition, or ion plating method can be used. As for the printing method, transferring printing, flexographic printing, gravure printing, and gravure offset printing, or the like may be used. In addition, other methods may be used. As for the CVD method, hot wiring CVD method, plasma CVD method, or the like may be used. In addition, different methods may be used such as a method of dissolving a hydrate of an inorganic salt of the above-mentioned metal (for instance, chloride) to alcohol or the like, and baking and sintering the mixture to produce an oxide semiconductor.

In the counter substrate 3 according to this embodiment, the transparent resin layer 12 is provided to cover directly or indirectly the black matrix 10. The surface of the transparent resin layer 12 that overlaps the black matrix 10 protrudes from the surface of the other transparent resin layer 13, thereby forming a convex portion 14. In the counter substrate 3, a concave portion 15 is formed in the area that passes the center of the unit sub-pixel or center of the unit pixel. The convex portions 14 and the concave portions 15 of the counter substrate 3 can be used for the control on the alignment of the liquid crystal. The convex portion 14 is formed by a direct or an indirect overlapping portion of the black matrix 10 and the transparent resin layer 13. In this embodiment, the arrangement of the liquid crystals at an inclined portion or a shoulder portion (a part of a shoulder) of the convex portion 14 may be used for the inclination of the liquid crystals during the application of the driving voltage.

Similarly, even in the concave portion 15, the arrangement of the liquid crystals at the inclined portion or the shoulder portion of the transparent resin layer 13 may be used for the inclination of the liquid crystals.

A preferable range of the height H of the convex portion 14 may be 0.4 μm to 2 μm. When the height H is 0.3 μm or less, the effect as "trigger of the inclination of the liquid crystal" during the application of the voltage is likely to be insufficient sometimes. On the other hand, when height H exceeds 2 μm, it acts as an obstacle to the flow of the liquid crystal when the liquid crystal cells are manufactured.

It is preferable that the depth D of the concave portion 15 is 0.3 μm or more. Moreover, the concave portion 15 may be substituted by a slit (a linear pattern or a cross pattern which is not formed of a transparent conductive film) in the third electrode 11.

Figure 2:
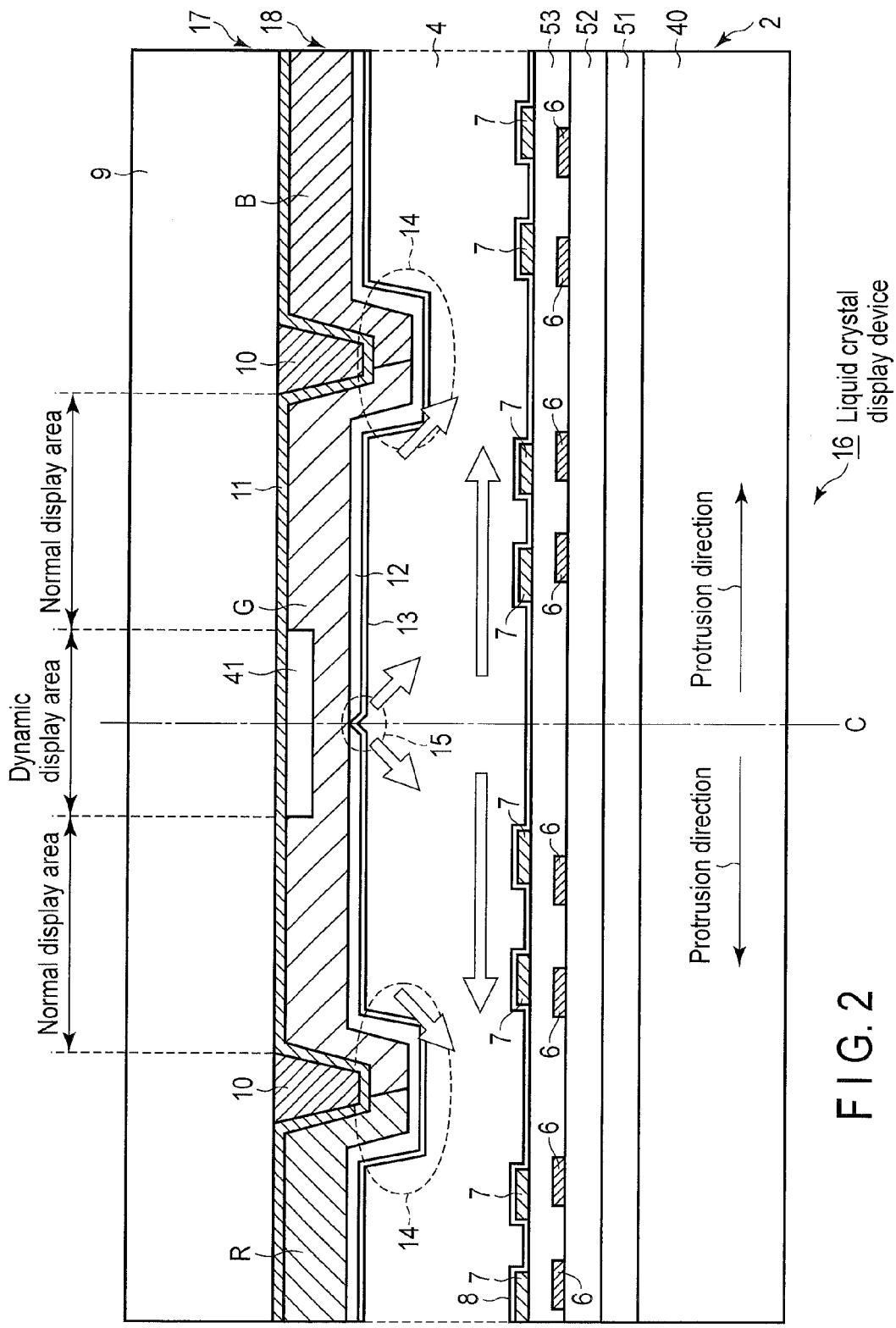
FIG. 2 is a partial cross-sectional view illustrating an example of a configuration of the liquid crystal display device including a color filter layer according to the first embodiment.

FIG. 2 is a partial cross-sectional view illustrating an example of a configuration of a liquid crystal display device including a color filter layer according to an embodiment.

A liquid crystal display device 16 has a configuration in which an array substrate 2 and a counter substrate 17 are joined each other with a liquid crystal layer 4 interposed therebetween.

The counter substrate 17 is configured by sequentially forming a black matrix 10, a third electrode 11, a transparent pattern 41, a color filter layer 18 including color filters (red filter R, green filter G, and blue filter B), a transparent resin layer 12, and an alignment sustaining layer 13 above a transparent substrate 9. For instance, the alignment sustaining layer 13 is stacked on the transparent resin layer 12 to have a film thickness of about 60 nm. At least any one of the black matrix 10 and the transparent pattern 41 may be used as a portion of the color filter layer 18. The color filters R, G, and B formed above the transparent pattern 30 are smoothly formed with a thin film thickness. For instance, the film thickness of the transparent pattern 30 may be about 0.6 μm, the film thickness of the portion of the color filters R, G, and B formed above the transparent pattern 30 to overlap each other may be about 1.4 μm, and the film thickness of the other portion of the color filters R, G, and B formed in the area where transparent pattern 30 is not formed may be about 2.0 μm.

Of the flat area where the color filters R, G, and B are formed, an area where the transparent pattern 41 is formed is referred to as a dynamic display area. On the other hand, of the flat area where the color filters R, G, and B are formed, an area where the transparent pattern 41 is not formed is referred to as a normal display area. In this embodiment, the dynamic display area is located at a center portion of the color filters R, G, and B in a plan view.

The color filter (that can be referred to as color pixel) is a coating film obtained by dispersing an organic pigment in a transparent resin. As for the color filter, the pattern is formed with a photolighography method in a unit sub-pixel or a unit pixel. In this embodiment, the color filters include the red filter R, the green filter G, and the blue filter B. An effective size of the color filter is almost the same as that of an open region of the matrix pattern.

The counter substrate 17 has a convex portion 14 and a concave portion 15 in the surface that is in contact with the liquid crystal layer 4. The convex portion 14 is formed at a position where the black matrix 10, the third electrode 11, the color filter layer 18, the transparent resin layer 12, and the alignment sustaining layer 13 are stacked. The concave portion 15 is formed at the center line position of the open region.

For instance, the alignment sustaining layers 8 and 13 are formed to have a film thickness of about 60 nm above the surfaces of the array substrate 2 and the counter substrate 17, respectively which are in contact with the liquid crystal layer 4. In FIG. 2, a polarizing plate, a retardation plate, or the like is not illustrated.

When a difference in relative dielectric constant among the color filters R, G, and B exceeds 0.8 or 1.0 in the counter substrate 17 including the color filter layer 18 above the counter electrode 11, an irregular color or an optical leakage is likely to occur during the display of the liquid crystal. In this embodiment, the relative dielectric constants of the color filters R, G, and B can be suppressed to a value of 4 or less in relative dielectric constant by selecting organic pigments that are color materials, a ratio of the pigments, a resin as a parent material, a dispersant, and other materials. For instance, as described later, as for the organic pigment of the green filter G, halogenated zinc phthalocyanine green pigments are preferable to halogenated copper phthalocyanine green pigment. It is possible to reduce the relative dielectric constant of the green filter G by using the halogenated zinc phthalocyanine green pigment for the color material of the green filter G. Accordingly, it is easy to make the value of the relative dielectric constant of the green filter G to be consistent with the values of the relative dielectric constants of the red filter R and the blue filter B. Moreover, when the standing up of the liquid crystal is fast for a short-wavelength side (blue filter B), and late for a long-wavelength side (red filter R) in the liquid crystal drive, the values of the relative dielectric constants of the color filters R, G, and B may be adjusted in order of the wavelength of light. Moreover, conditions that do not negatively influence the liquid crystal drive may be provided by reducing the values of the relative dielectric constants of configuration elements of the color filters R, G, and B to be smaller than the value of the dielectric anisotropy $\Delta\in$ of the liquid crystal used as the liquid crystal display device 16. A photosensitive acrylic resin may be used to form the color filters R, G, and B. In general, the relative dielectric constant of the transparent resin such as acrylic resin is about roughly 2.8. As a result of investigation, a lower limit of the relative dielectric constants of the color filters R, G, and B that are organic pigments dispersed bodies was roughly 2.9.

For instance, as the material of the first electrode 7 and the second electrode 6 of the array substrate 2 of the liquid crystal display device 16 according to the present embodiment, a conductive metallic oxide thin film such as ITO may be used. Moreover, the first electrode and the second electrode may be formed using a thin metallic film which is higher in electroconductivity than the metallic oxide thin film. When the liquid crystal display device 16 is a reflection type or a transflective type, an aluminum thin film or an aluminum alloy thin film may be used for either the first electrode 7 or the second electrode 6.

The first electrode 7 and the second electrode 6 are electrically insulated from each other in a thickness direction by an insulating layer 53. The thicknesses of the color filter layer 18, the transparent resin layer 12, and the insulating layer 53 can be adjusted according to the thickness, the dielectric constant, the application voltage, and the drive conditions of the liquid crystal layer 4. When the insulating layer 53 is of SiNx (nitride silicon), the range of a practicable film thickness of the insulating layer 53 is from 0.1 μm to 0.6 μm for instance. The positions of the first electrode 7 and the second electrode 6 in the film thickness direction may be reversed. Moreover, since the oblique electric field can be more effectively used in the liquid crystal display device 16 according to this embodiment, the range in which the line of electric force during the application of the drive voltage is exerted can be increased in the thickness direction so that the range includes the liquid crystal layer 4 and the transparent resin layer 12. Accordingly, the transmittance can be increased. Further, a technology that forms a signal line such as a gate wiring, source wiring, or the like with a single-layer of an aluminum alloy that exhibits poor contact with ITO that is an electroconductive metallic oxide is disclosed in, for instance, Jpn. Pat. Appln. KOKAI Publication No. 2009-105424. Stacking an insulating layer on the first electrode 7 is preferable because it has an effect of alleviating image sticking (attributable to biasing or accumulation of charges) of the liquid crystal during the driving of the liquid crystal.

In the present embodiment, even though the relative dielectric constants of the color filters R, G, and B are comparatively important characteristics, but are almost uniquely determined depending on the ratio of the organic pigments added as colorant with respect to the transparent resin. Therefore, it might be difficult to adjust the relative dielectric constant extremely greatly. In other words, the kinds or the contents of the organic pigments in the color filters R, G, and B are set according to a necessary chromatic purity required in the liquid crystal display device 16, and the relative dielectric constant of the color filter layer 18 is determined accordingly. The relative dielectric constant can be set to be four or more by raising the ratio of the organic pigments and hence thinning the color filter layer 18. Moreover, the relative dielectric constant can be slightly improved by using a high refractive index material as the transparent resin.

The thicknesses of the color filter layer 18 and the transparent resin layer 12 are optimized based on the relation with the cell gap of the liquid crystal (the thickness of the liquid crystal layer 4). When the thicknesses of the color filter layer 18 and the transparent resin layer 12 are set to be small in terms of necessary electrical characteristics, the thickness of the liquid crystal layer 4 can be increased. When the film thicknesses of the color filter layer 18 and transparent resin layer 12 are large, the thickness of liquid crystal layer 4 can be decreased accordingly.

Hereinbelow, the operation and effect of the liquid crystal display device 16 including the counter substrate 17 and the liquid crystal layer 4 will be described. In the liquid crystal display device 16, when the counter substrate 17 is viewed in the vertical direction, the counter substrate 17 includes the convex portion 14 where the black matrix 10, the third electrode 11, the color filter layer 18, the transparent resin layer 12, and the alignment sustaining layer 13 are stacked. The counter substrate 17 also includes the concave portion 15 that passes the central line portion of the open region. The liquid crystal layer 4 has negative dielectric anisotropy.

Figure 3:
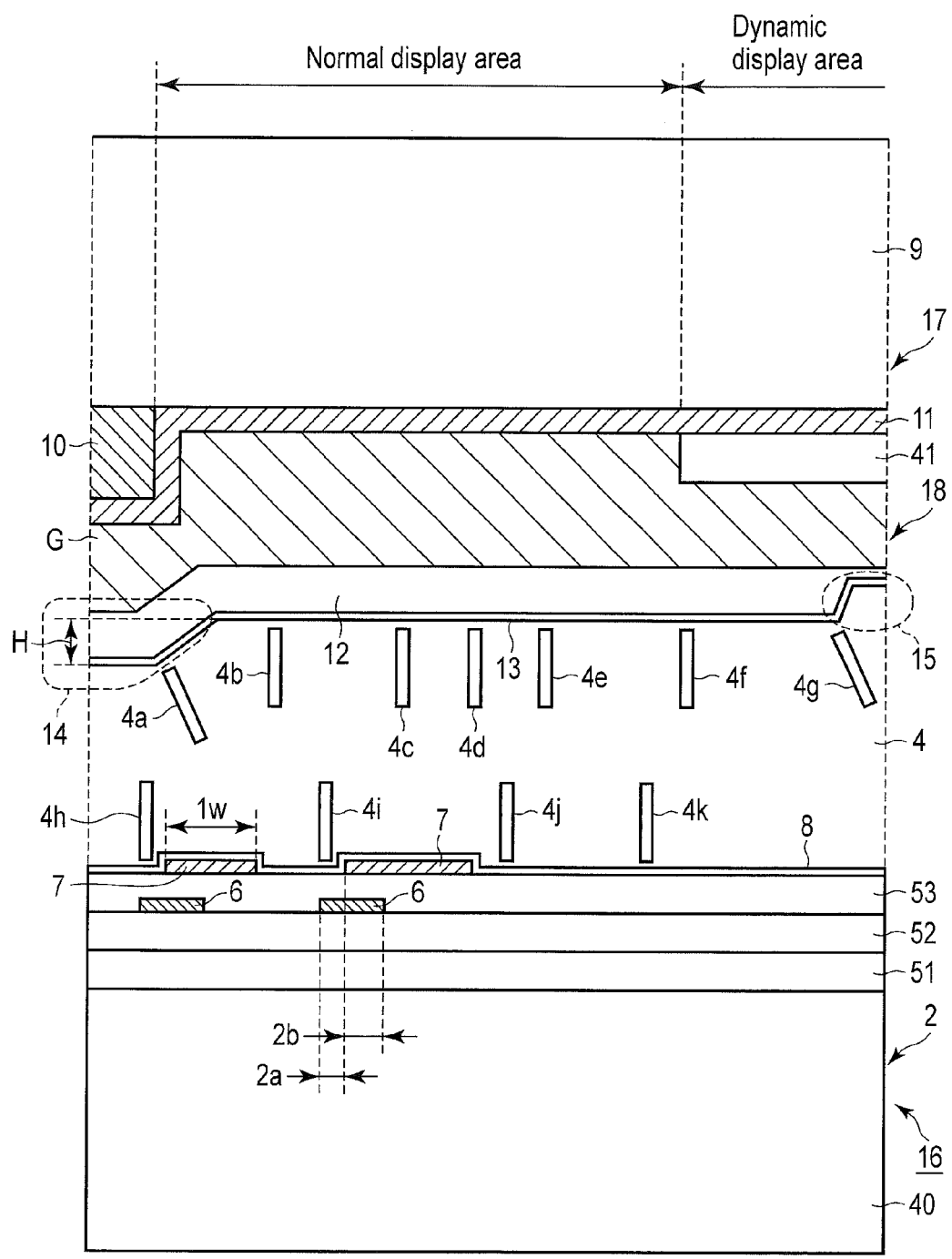
FIG. 3 is a partial cross-sectional view illustrating an example of the liquid crystal display device including vertically aligned liquid crystals in an initial state before a pre-tilt angle is given.

FIG. 3 is a partial cross-sectional view illustrating an example of the liquid crystal display device 16 including vertically aligned liquid crystals in an initial state before a pre-tilt angle is given. FIG. 3 illustrates a left half of the green filter G of FIG. 2. Moreover, polarizing plates which are not illustrated in FIG. 3 are in the state of crossed-Nicols. The liquid crystal display device 16 is normally black. The polarizing plate is generated by drawing a polyvinyl alcohol-based organic polymer that contains iodine for example, and has an absorption axis in a drawing direction.

FIG. 3 illustrates an initial alignment state of liquid crystals (liquid crystal molecules) 4a to 4k of the vertical alignment before an alignment process is performed. Further, the liquid crystals 4a and 4g near the shoulder portion of the convex portion 14 and the shoulder portion of the concave portion 15 are almost perpendicularly aligned to the shoulder portion, and a large pre-tilt angle is given in an early stage of alignment. The alignment films that will become the alignment sustaining layers 8 and 13 by the alignment process has a thickness of about 60 nm, and are formed above the surface of the array substrate 2 and the counter substrate 17 which are in contact with the liquid crystal layer 4. The polarizing plate, the retardation plate, and the like are not illustrated in FIG. 3. In the following description, since the liquid crystals which are nearest to the alignment sustaining layers 8 and 13 are strongly influenced by an anchoring action, and hence these liquid crystals are not necessary in describing the operation of the liquid crystal, the liquid crystals nearest to the alignment sustaining layers 8 and 13 are not illustrated in FIG. 3.

FIG. 4 is a partial cross-sectional view that illustrates an example of the liquid crystal display device 16 in which liquid crystals 4a to 4k contained in the liquid crystal layer 4 are given a pre-tilt angle. In the liquid crystal display device 16 of FIG. 4, the pre-tilt angle θ of roughly from 0.4° to 0.9° is imparted to the alignment sustaining layers 8 and 13 of FIG. 3. Therefore, vertically aligned liquid crystals 4b to 4f and 4h to 4k of FIG. 3 have a pre-tilt angle θ of less than 1° in FIG. 4.

Figure 5:
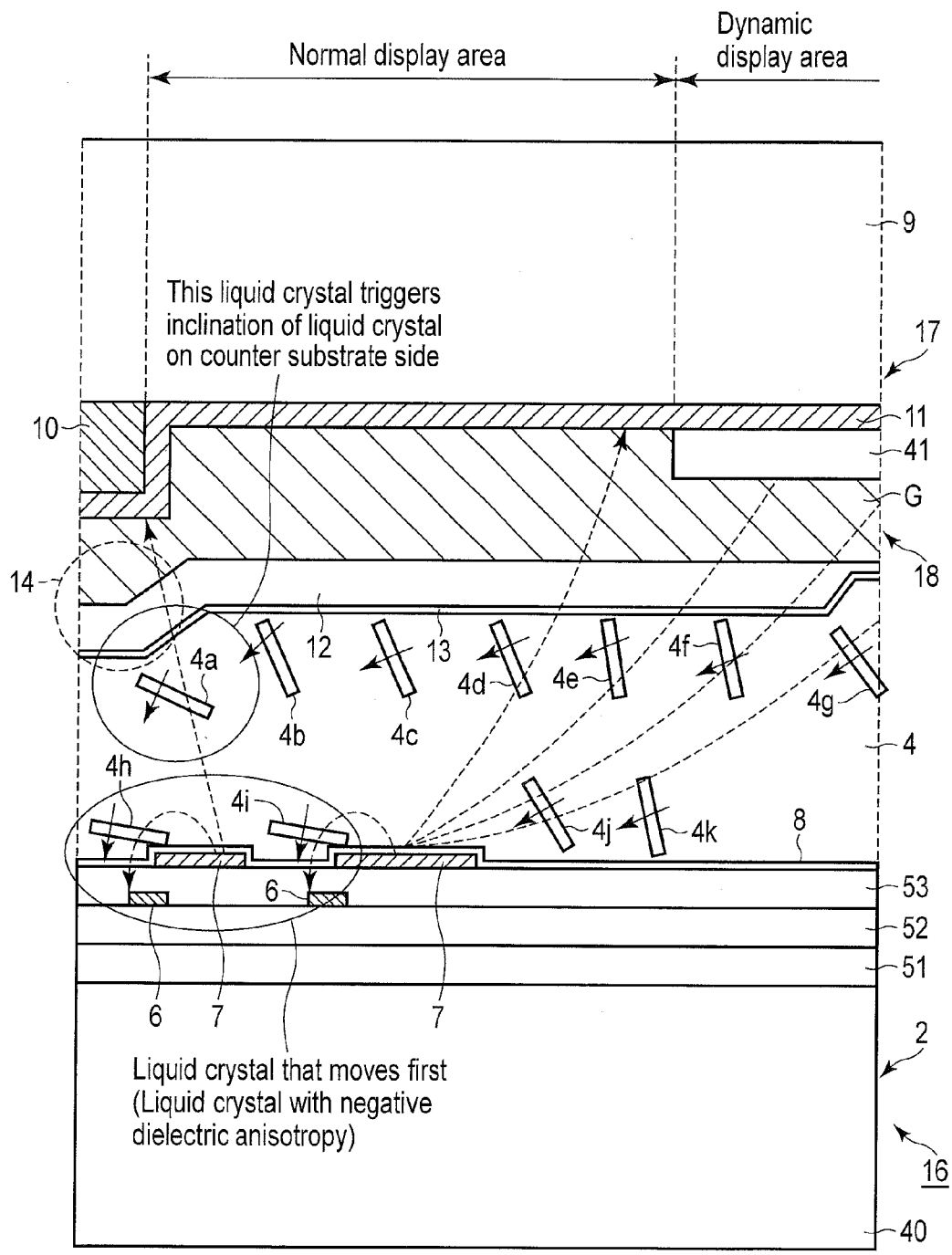
FIG. 5 is a partial cross-sectional view illustrating an example of the liquid crystal display device according to the first embodiment immediately after a liquid crystal drive voltage is applied to a first electrode.

FIG. 5 is a partial cross-sectional view illustrating an example of the liquid crystal display device 16 that includes the alignment sustaining layers 8 and 13 illustrated in FIG. 4 immediately after the liquid crystal drive voltage is applied to the first electrode 7. In FIG. 5, a cross-section of the left half of the unit sub-pixel or the unit pixel is illustrated. The liquid crystals 4a to 4k incline in the direction of arrows of FIG. 5 immediately after the liquid crystal drive voltage is applied to the first electrode 7.

In FIG. 5, the second electrode 6 and the third electrode 11 have a common potential. As the drive voltage is applied, the liquid crystals 4a, 4h, and 41 begin to incline first, and liquid crystals adjacent to the liquid crystals 4a, 4h, and 41 incline in turns. Specifically, in the shoulder portion of the convex portion 14, the liquid crystal 4a is pre-tilted and the third electrode 11 is formed above the black matrix 10. Accordingly, the distance between the first electrode 7 and the third electrode 11 is short. Therefore, the applied drive voltage is easily transferred to the liquid crystal 4a unlike the central line portion of the unit sub-pixel or the unit pixel. Therefore, the liquid crystal 4a near the shoulder portion of the convex portion 14 acts as a trigger of a inclining operation of other liquid crystals on the counter substrate 17 sides.

The liquid crystals 4h and 4i on the array substrate 2 side incline for the first time because the distance between the first electrode 7 and the second electrode 6 is equal to the thickness of the insulating layer 53 (for example, 0.4 μm) which results in a practically strong drive voltage being applied therebetween. The liquid crystals 4a to 4k incline easily at a low voltage because the liquid crystals 4a to 4k are pre-tilted at a slight angle by the alignment sustaining layers 8 and 13. For this reason, in the liquid crystal display device 16 according to this embodiment, controllability at a low voltage improves, which leads to improvements in the response of the liquid crystals 4a to 4k and an ability to display the halftone. In other words, in FIG. 5, the propagation of the inclining to the horizontal direction from the liquid crystals 4a, 4h, and 4i which serve as the trigger of the inclining operation to other liquid crystals 4b to 4f, 4j, and 4k becomes remarkably fast, and thus the response speed improves. The liquid crystals 4b to 4f, 4j, and 4k incline quickly in a direction from the center portion to both ends of the unit sub-pixel or the unit pixel as if the unit sub-pixel or the unit pixel is divided into two, for example, as indicated by the arrows in FIG. 2.

Figure 6:
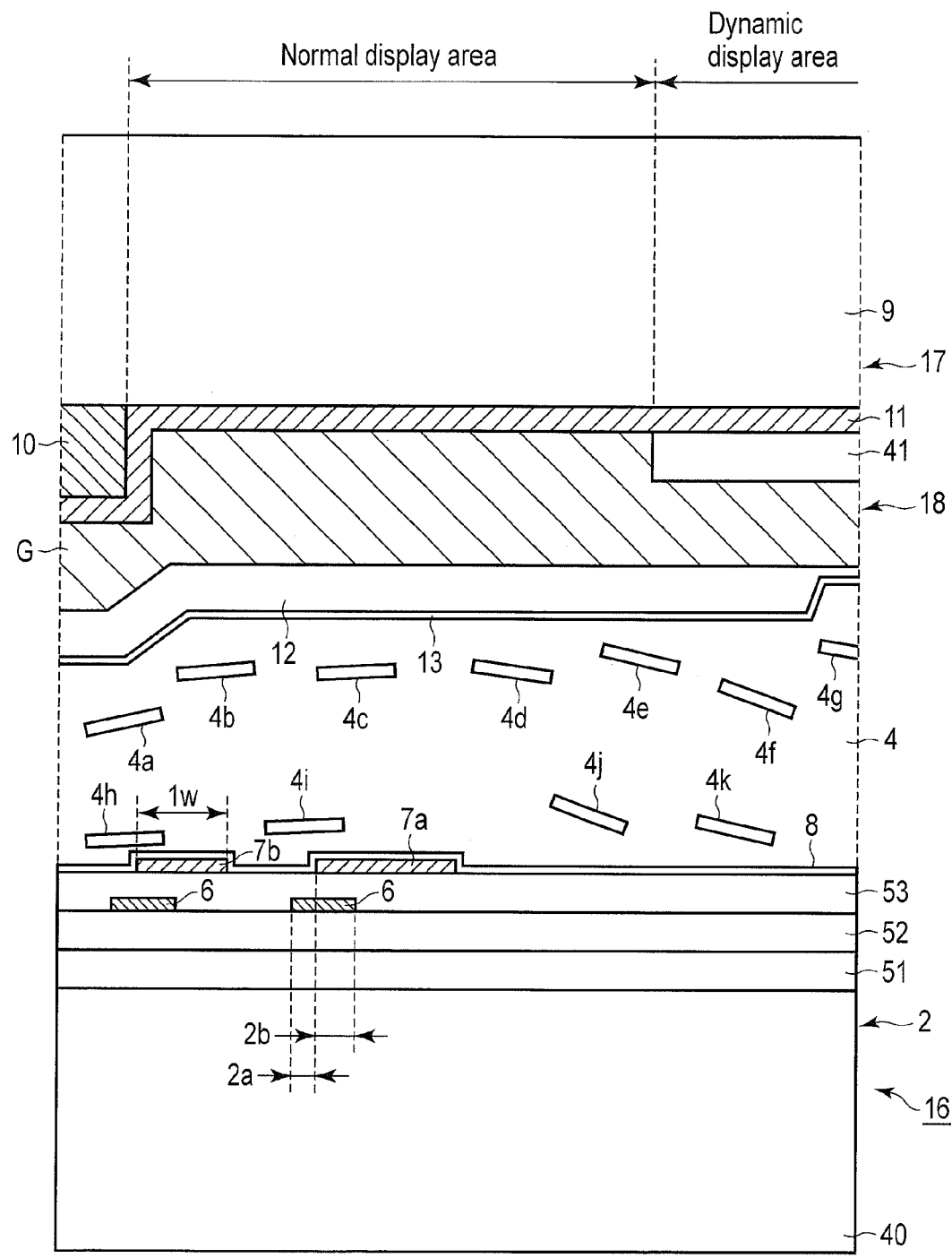
FIG. 6 is a partial cross-sectional view illustrating an example of the liquid crystal display device according to the first embodiment after a predetermined time has passed since the liquid crystal drive voltage was applied.

FIG. 6 is a partial cross-sectional view illustrating an example of the liquid crystal display device 16 after a predetermined time has passed since the liquid crystal drive voltage was applied. FIG. 6 illustrates the left half of the cross-section of a green sub-pixel or a green pixel, and hence illustrates the state of a green display. In the counter substrate 17 without the color filter layer 18, when the liquid crystals 4a to 4k incline, white is displayed.

The transparent pattern 41 is formed of a transparent resin in FIG. 6. The transparent pattern 41 is formed at center portion of the flat areas where the color filters R, G, and B are formed. The flat area where the transparent pattern 41 is formed is referred to as a dynamic display area. On the other hand, of the flat areas of the color filters R, G, and B, an area where the transparent pattern 41 is not formed is referred to as a normal display area. The film thickness of the dynamic display area of the color filters R, G, and B is usually thinner than the film thickness of the normal display area of the color filters R, G, and B. Therefore, the amount of the optical transmission in the dynamic display area is larger than the amount of the optical transmission in the normal display area, so that the dynamic display area can be displayed more brightly than the normal display area. The liquid crystal 4f arranged in the dynamic display area can be independently controlled by driving a comb-teeth portion 7a inside the open region among the comb-teeth portions of the first electrode 7 with an active element which is different from an active element used to drive the comb-teeth portion 7b outside the open region, so that the brightness of the sub-pixel or the pixel can be adjusted.

Even though not illustrated in FIGS. 5 and 6, the inclination direction of the liquid crystals on the other half side (the right half side) of the sub-pixel or the pixel is opposite to the inclination direction illustrated in FIGS. 5 and 6. In this embodiment, in the unit sub-pixel or the unit pixel, the inclination gradient of the liquid crystal on the right half side is opposite to that on the left half side, so that a wide viewing angle can be secured.

In this embodiment, for example, in the unit sub-pixel or the unit pixel, the first electrode 7 and the second electrode 6 being comb-teeth shape electrodes are arranged in multiple arrangement directions, and extensions of the second electrodes 6 extend in multiple directions. In this way, it is possible to form liquid crystal domains with different arrangement directions within the unit sub-pixel or the unit pixel, and therefore it is possible to increase the viewing angle. The overlapping portion 2b of the first electrode 7 and the second electrode 6 acts as an auxiliary capacitor and is used for liquid crystal driving.

Figure 7:
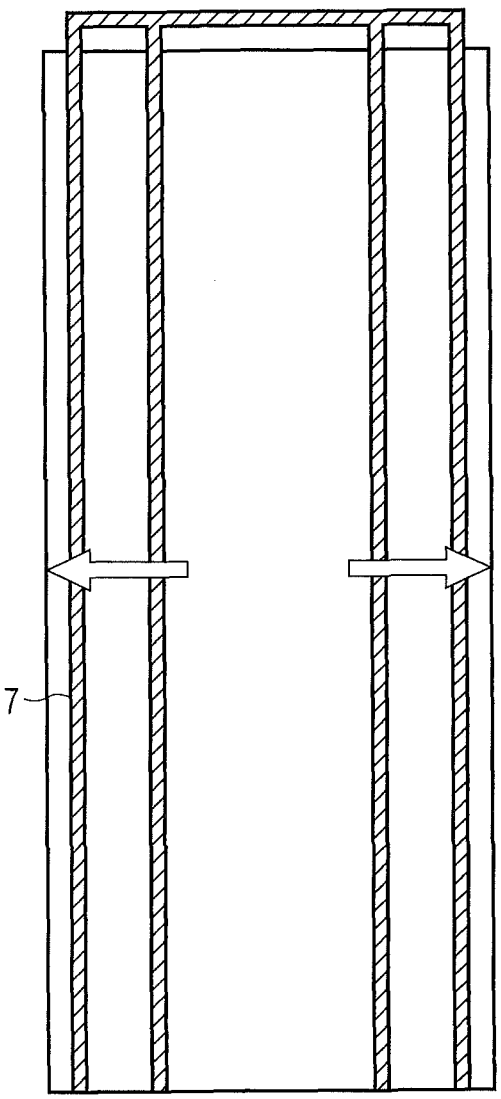
FIG. 7 is a plan view illustrating a first example of a plan view shape of a unit sub-pixel or a unit pixel.
Figure 8:
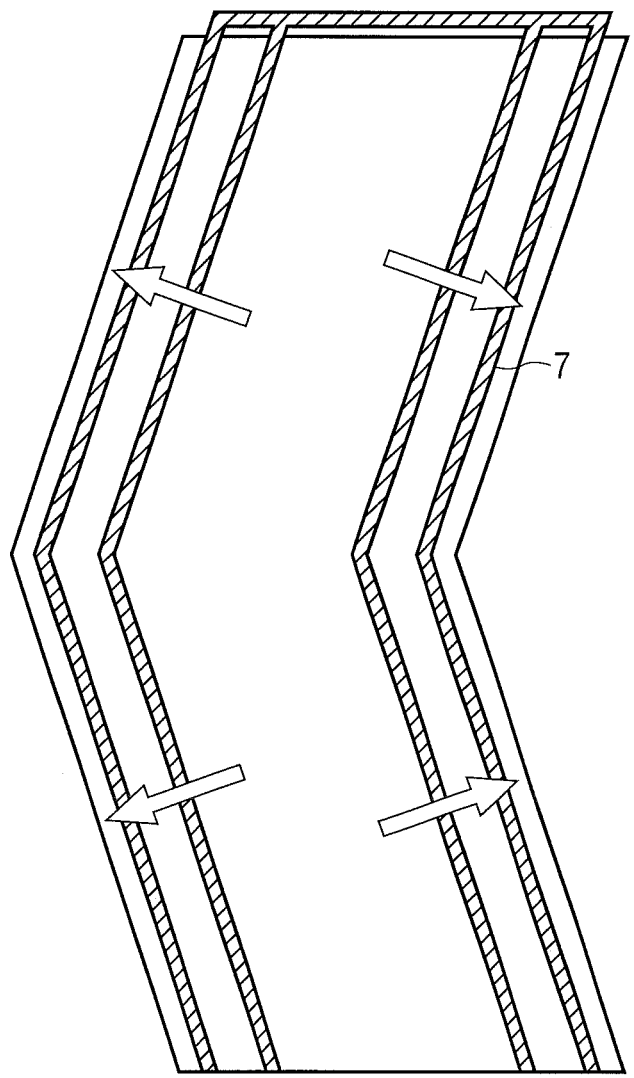
FIG. 8 is a plan view illustrating a second example of the plan view shape of the unit sub-pixel or the unit pixel.
Figure 9:
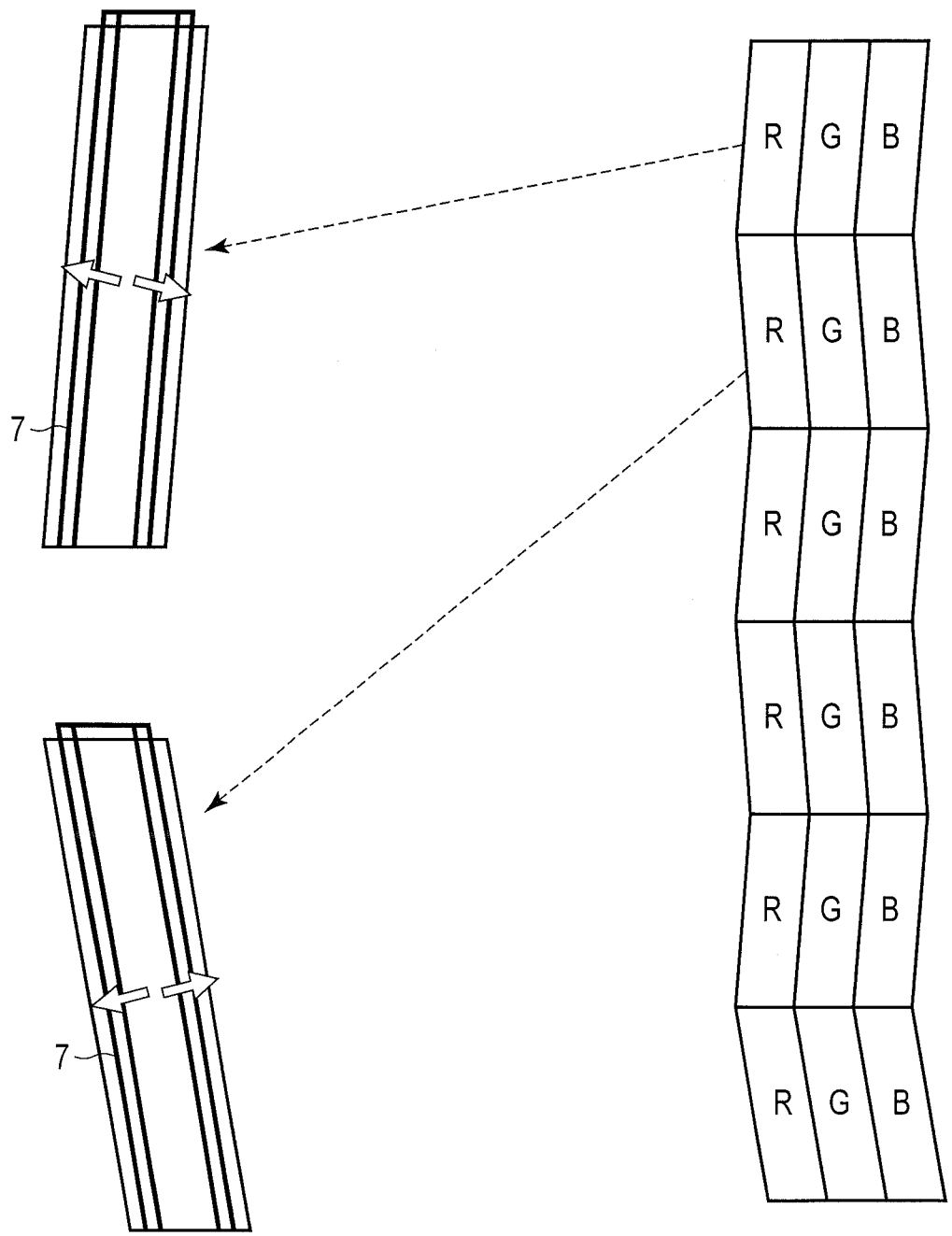
FIG. 9 is a plan view illustrating a third example of the plan view shape of the unit sub-pixel or the unit pixel.

FIGS. 7 to 9 are plan views illustrating first to third examples of a plan view shape of the unit sub-pixel or the unit pixel.

A plan view shape of the unit sub-pixel or the unit pixel (a plan view shape of the open region formed by the black matrix) may be a polygonal shape where respective opposing sides are parallel to each other, such as a square, a rectangle, a parallelogram, and a bending form "<" (a letter V shape or a boomerang shape).

FIGS. 7 to 9 illustrate the relation between the plan view shape of the unit sub-pixel or the unit pixel and the first electrode 7. FIG. 7 is an example of a plan view of the unit sub-pixel or the unit pixel having a rectangular shape. FIG. 8 is an example of a plan view of the unit sub-pixel or the unit pixel having the "<" shape. FIG. 9 is an example of a plan view of the unit sub-pixel or the unit pixel having a parallelogram shape. The arrows in FIGS. 7 to 9 indicate the inclining directions of the liquid crystals. In FIGS. 7 to 9, the axis direction of the comb-teeth portion of the first electrode 7 is in parallel to the side or the long axis of the unit sub-pixel or the unit pixel.

The plan view shape of the unit sub-pixel or the unit pixel is preferable the "<" shape illustrated in FIG. 8 or a parallelogram shape illustrated in FIG. 9 to achieve a wide viewing angle of the liquid crystal display.

Active elements are formed in the unit sub-pixel or the unit pixel, and the unit sub-pixels or the unit pixels are divisionally driven by using the respective active elements and the comb-teeth shaped pixel electrodes. This configuration and driving method can be used to control viewing angle and perform a stereoscopic pixel display. In a combination of unit sub-pixels or unit pixels that have the "<" shape or parallelogram, the comb-teeth portions of the pixel electrode and the comb-teeth portions of the common electrode are arranged in parallel to the long axis direction of the unit sub-pixels or the unit pixels. As a result, a plurality of domains can be formed in the unit sub-pixel or the unit pixel. Since a plurality of domains can be formed in the direction where the pre-tilt angle of the liquid crystal is formed, the viewing angle can be widened. The inclining directions of the liquid crystals are determined according to the directions of the extensions of the common electrode which extend horizontally with respect to the pixel electrode, so that a plurality of domains can be formed and the viewing angle can be widened.

For example, by using a configuration in which the plan view shape of the unit sub-pixel or the unit pixel is the "<" shape or a parallelogram, it is possible to form a plurality of liquid crystal domains with different arrangement directions.

In the related arts, when a plurality of liquid crystal domains were formed to widen the viewing angle, it was necessary to rub the alignment sustaining layer multiple times in multiple directions or to perform optical alignment multiple times or to perform optical alignment in multiple directions. However, according to the present embodiment, the liquid crystal domains with different arrangement directions can be formed without performing alignment process multiple times, and therefore the viewing angle can be widened.

FIG. 10 is a plan view illustrating an example of a plurality of first electrodes and a plurality of active elements provided in a unit sub-pixel or a unit pixel.

In FIG. 10, a plurality of first electrodes 7 where arrangement directions of comb-teeth portions are different are arranged in the unit sub-pixel or the unit pixel. One or more active elements 19 are electrically connected with the plurality of first electrodes 7. In FIG. 10, the active elements 19 are connected with the first electrodes 7, respectively. In the unit sub-pixel or the unit pixel, the extensions of the second electrode 6 horizontally extend toward the first electrodes 7 in different directions. In this way, arrangement directions are realized in the unit sub-pixel or the unit pixel, so that the viewing angle can be widened.

FIG. 11 is a plan view illustrating a first example of flaw lines formed on the surface of the first electrode 7 on the liquid crystal side.

For instance, when the width of the first electrode 7 of the comb-teeth shape exceeds 4 μm or when the first electrode 7, which have a large width and arranged with a rough pitch, are used to cope with a large-scale liquid crystal display or pixels of 250 ppi (pixel per inch) or less, the concave portion or the flaw line can be formed on the surface of the first electrode 7 (surface on the liquid crystal side) to facilitate the inclining of the liquid crystal molecules and give fluctuation of the liquid crystal alignments to the liquid crystal molecules. In the example of FIG. 11, one or more flaw lines 71 having a width of 1 μm or less are formed on the surface of the first electrode 7 having a comb-teeth shape in a direction substantially perpendicular to the direction in which the extensions of the second electrode 6 extend.

FIG. 12 is a plan view illustrating a second example of flow lines formed on the surface of the first electrode 7 on the liquid crystal side.

For instance, one or more flaw lines 72 having a width of 1 μm or less is formed on the surface of the first electrode 7 having a comb-teeth shape in a direction substantially parallel to the direction in which the extensions of the second electrode 6 extend.

The flaw lines 71 and 72 are formed on the surface of the first electrode 7, and, as a result, texture like stripes appears in the aligning layer or the alignment sustaining layer formed on the first electrode 7. Specifically, when the first electrode 7 is formed of a transparent conductive film like ITO, the flaw lines 71 and 72 which are 20 nm to 40 nm in depth and about 1 μm in width are formed, for example, by slightly and linearly etching the surface of the ITO having a thickness of 150 nm. Subsequently, the alignment layer or the alignment sustaining layer is formed on the first electrode 7 to a thickness of about 50 nm, that is, formed to have a thin film thickness, and as a result, the texture of the flaw lines 71 and 72 appears on the surface of the alignment layer or the alignment sustaining layer. The formation of the flaw lines 71 and 72 may be achieved with slight etching by 20 nm to 40 nm in depth. The flaw lines 71 and 72 may be 50 nm or more in depth and 1 μm or less in width. At a portion where the first electrode 7 and the second electrode 6 do not overlap in a plan view, the flaw lines 71 and 72 may be formed to have a depth almost equal to the depth of the transparent conductive film so that gaps may be formed in the first electrode 7. When viewing the cross-section, the flaw lines 71 and 72 may be tapered. It is preferable that the width of the flaw line which is formed by etching may be 1 μm or less at a lower portion of the flaw line. The pitch of the flaw lines 71 and 72 may be 2 μm to about 10 μm, for example.

When an oblique electric field is generated between the first electrode 7 and the third electrode (counter electrode) 11, the liquid crystal molecules on the first electrode 7 may uniformly incline in the protrusion direction based on the flaw lines 71 and 72. The protrusion direction is about parallel to the perpendicular direction with respect to the longitudinal direction of the second electrode 6. In a plan view of the first electrode 7, in the wide first electrode 7 in which the flaw lines 71 and 72 are not formed, the inclination of the liquid crystal molecules is not uniform between a corner portion and a center portion of the first electrode 7, and therefore the brightness and irregularity of transmittance is likely to occur on the first electrode 7 and in the sub-pixel. Such a brightness irregularity result in a decrease in transmittance of the sub-pixel. In addition, although the liquid crystal molecules are vertically aligned on the flaw lines 71 and 72, the liquid crystal molecules are likely to incline at a low voltage due to the influence of the texture exhibited by the flaw lines, and thus high-speed driving can be achieved. The flaw lines 71 and 72 are formed by one or more according to the width of the first electrode 7. When the width of the first electrode 7 is 4 μm or less, that is, the first electrode 7 is narrow, the flaw lines may not be formed.

In a fourth embodiment to be described later, a technology is described which forms the alignment sustaining layer obtained by causing the photosensitive alignment film to have a pre-tilt angle by irradiating light to the alignment film while applying a voltage to the first electrode 7, the second electrode 6, and the third electrode 11. By forming the flaw lines 71 and 72 on the surface of the first electrode 7, which is a pixel electrode, in advance, it is possible to easily form the alignment sustaining layer which is produced when the photosensitive alignment film is given a pre-tilt angle.

In this embodiment described above, it is possible to increase the display precision and accuracy of the liquid crystal display devices 1 and 16, and accordingly the manufacturing process of the liquid crystal display devices can be simplified.

In this embodiment, it is possible to improve the halftone display and the response of the vertically aligned liquid crystal at a low voltage.

In the liquid crystal display devices 1 and 16 according to the embodiments, the voltage applied to the liquid crystal has a homogeneous expanse as the shape of an isoelectric line. Therefore, at least one of the transparent resin layer 12 and the color filter layer 18 is stacked on the third electrode 11 as a dielectric substance in the counter substrates 3 and 17. In this embodiment, the inclinations of the liquid crystals in the unit sub-pixel or the unit pixel can be enhanced since the isoelectric line extends uniformly, and, as a result, the transmittance can be improved.

In this embodiment, at least one of the transparent resin layer 12 and the color filter layer 18 is stacked on the counter electrodes 3 and 17 as a dielectric substance. In this configuration, a spacer that defines the liquid crystal cell gap may be formed by stacking at least one of the transparent resin layer 12 and the color filter layer 18. As a result, the counter substrate 3 or 17 cannot be brought into contact with the array substrate 2, and thus it is possible to eliminate the brightness defect due to counter short-circuits.

In the embodiments, the third electrode 11 may be formed to be near the liquid crystal layer 4 (for example, on the liquid crystal layer 4 side rather than the transparent resin layer 12 side, or on the liquid crystal layer 4 side rather than the color filter layer 18 side).

Second Embodiment

In this embodiment, a preferable green pigment for a green filter G described by in the above-mentioned first embodiment will be described. The contents of a composition indicated by the following embodiments are a mass ratio, and the part is a mass part.

(Measurement of Relative Dielectric Constant of Green Pigment)

The relative dielectric constant of a green pigment is measured by using an impedance analyzer, with frequencies of 120, 240, and 480 Hz in a voltage condition of 3V. A measurement sample is formed in such a manner that on a glass substrate on which a pattern of a conductive film of an aluminum thin film is formed, a green filter G is coated and cured (for example, a film thickness: 2 μm), and then a conductive film pattern formed of an aluminum thin film is formed on the green filter G.

Relative dielectric constants of the following three kinds of green filters G are measured: Green composition 1 containing the following Green pigment 1, Green composition 2 containing Green pigment 2, and Green composition 3 containing Green pigment 3.

(Preparation of Green Pigment 1)

A mixture of the following composition is homogeneously stirred and mixed, then dispersed using glass beads having a diameter of 1 mm for 5 hours by a sand milling method, and finally filtered using a filter of 5 μm, thereby producing a dispersoid of Red pigment 1.

| Green pigment: C.I. Pigment Green 58 | 10.4 parts |
| Yellow pigment: C.I. Pigment Yellow 150 | 9.6 parts |
| Dispersing agent | 2 parts |
| Acrylic varnish (solid: 20% by mass) | 66 parts. |

(Preparation of Green Pigment 2)

A mixture of the following composition is used and a dispersoid of Green pigment 2 is prepared in a similar manner to Green pigment 1.

| Green pigment: C.I. Pigment Green 58 | 10.4 parts |
| Yellow pigment: C.I. Pigment Yellow 150 | 3.2 parts |
| Yellow pigment: C.I. Pigment Yellow 138 | 7.4 parts |
| Dispersing agent | 2 parts |
| Acrylic varnish (solid: 20% by mass) | 66 parts |

(Preparation of Green Pigment 3)

A mixture of the following composition is used and a dispersoid of Green pigment 3 is prepared in a similar manner to Green pigment 1.

| Green pigment: C.I. Pigment Green 36 | 10.4 parts |
| Yellow pigment: C.I. Pigment Yellow 150 | 9.6 parts |
| Dispersing agent | 2 parts |
| Acrylic varnish (solid: 20% by mass) | 66 parts. |

(Preparation of Green Composition 1)

A mixture of the following composition is homogeneously stirred and mixed and then filtered with a filter of 5 μm to produce Green composition 1.

| Green pigment 1 | 46 parts |
| Acrylic resin solution | 8 parts |
| Dipentaerythritol pentaacrylate and hexaacrylate | 4 parts |
| Optical polymerization initiator | 1.2 parts |
| Optical polymerization initiator | 3.5 parts |
| Sensitizer | 1.5 parts |
| Cyclohexanone | 5.8 parts |
| Propylene glycol monomethylic ether acetate | 30 parts |

(Preparation of Green Composition 2)

Green composition 2 is prepared by using the same composition and method as Green composition 1 except that Green pigment 2 is used as a dispersoid.

(Preparation of Green Composition 3)

Green composition 3 is prepared by using the same composition and method as Green composition 1 except that Green pigment 3 is used as a dispersoid.

(Comparison of Relative Dielectric Constants Among Green Composition 1 to Green Composition 3)

Relative dielectric constants of Green composition 1, Green composition 2, and Green composition 3 are listed in Table 1.

TABLE 1

| | | Pigment | | |
| --- | --- | --- | --- | --- |
| | | Green pigment 1 | Green pigment 2 | Green pigment 3 |
| | | Composition | | |
| | | Green composition 1 | Green composition 2 | Green composition 3 |
| Relative dielectric constant | 120 Hz | 3.7 | 3.5 | 4.6 |
| | 240 Hz | 3.7 | 3.4 | 4.5 |
| | 480 Hz | 3.7 | 3.4 | 4.5 |

The relative dielectric constants of the coating films of a composition of a blue pigment used for a blue filter B and a composition of a red pigment used for a red filter R of the color filter layer 18 of the liquid crystal display device 16 can be adjusted to be roughly within the range of 3.1 to 3.7, and therefore a halogenated zinc phthalocyanine green pigment is more suitable than the halogenated copper phthalocyanine green pigment described in the first embodiment as a' main green pigment of the green filter G. The main green pigment means a green pigment that is most largely contained in the green filter G.

Third Embodiment

A transparent resin, an organic pigment, and the like used for the counter electrodes 3 and 17 according to the first embodiment will be described below.

(Transparent Resin)

A photosensitive color composition used to form the light-shielding layer such as the black matrix 10 or the color filters R, G, and B contains a polyfunctional monomer, a photosensitive resin or a non-photosensitive resin, a polymerization initiator, a solvent, and the like besides a pigment dispersoid. For example, highly transparent organic resins that can be used in the embodiments such as photosensitive resins and non-photosensitive resins may be collectively referred to as a transparent resin.

As the transparent resin, a thermoplastic resin, a thermosetting resin, or a photosensitive resin can be used. As the thermoplastic resin, a butyral resin, a styrene maleic acid copolymer, a chlorinated polyethylene, a chlorinated polypropylene, polyvinyl chloride, a vinyl chloride vinyl acetate copolymer, a polyvinyl acetate, a polyurethane-based resin, a polyester resin, an acrylic resin, an alkyd resin, a polystyrene resin, a polyamide resin, a rubber-based resin, a cyclorubber-based resin, celluloses, and polybutadiene, polyethylene, polypropylene, a polyimide resin, or the like may be used. Moreover, as the thermosetting resin, for example, an epoxy resin, a benzoguanamine resin, a rosin modified maleic acid resin, a rosin modified fumaric acid resin, a melamine resin, a urea resin, a phenolic resin, or the like can be used. The thermosetting resin may be generated by reacting a melamine resin with a compound containing isocyanate group.

(Alkali Soluble Resin)

A photosensitive resin composition that can be patterned by photolithography is preferably used to form the light-shielding layer such as the black matrix 10, the transparent pattern, and the color filters R, G, and B that are used in the embodiments. It is preferable that these transparent resins are resins to which the alkali solubility is imparted. A resin containing a carboxyl group or a hydroxyl group may be used as the alkali soluble resin, and other resins may be also used. For example, as the alkali soluble resin, an epoxyacrylate resin, a Novolac resin, a polyvinyl phenol-based resin, an acrylic resin, a carboxyl group-containing epoxy resin, a carboxyl group-containing urethane resin, or the like can be used. Among these, as the alkali soluble resin, an epoxyacrylate resin, a Novolac resin, and an acrylic resin are preferably used, and especially an epoxyacrylate resin or a Novolac resin are preferable.

(Acrylic Resin)

The following acrylic resins are given as representative examples of the transparent resin that can be applied to the embodiments.

As the acrylic resin, for example, copolymers obtained by using the following as monomer may be used: (meth)acrylate; alkyl(meth)acrylate such as methyl (meth)acrylate, ethyl (meth)acrylate, propyl(meth)acrylate, butyl (meth)acrylate, t-butyl (meth)acrylate, benzyl (meth)acrylate, and lauryl (meth)acrylate; hydroxyl group-containing (meth)acrylate such as hydroxylethyl (meth)acrylate and hydroxy propyl (meth)acrylate; ether-containing (meth)acrylate such as ethoxyethyl (meth)acrylate and glycidyl(meth)acrylate; and cycloaliphatic(meth)acrylate such as cyclohexyl(meth)acrylate, isobornyl(meth)acrylate, and dicyclopentenyl(meth)acrylate.

The monomers mentioned here may be used alone or in combination of two or more kinds. In addition, the acrylic resin may be generated by using copolymers of these monomers and copolymerizable compounds such as styrene, cyclohexylmaleimide, and phenylmaleimide.

Moreover, the photosensitive resin may be generated by reacting a copolymer that can be obtained by copolymerizing carboxylic acid having an ethylenically unsaturated group such as (meth)acrylic acid, and a compound containing an epoxy group and an unsaturated double bond such as glycidylmethacrylate. For example, the photosensitive resin may be generated by adding a carboxylic acid-containing compound such as (meth)acrylate to a polymer of an epoxy group-containing (meth)acrylate such as glycidylmethacrylate, or a copolymer of the polymer and other (meth)acrylate.

(Organic Pigment)

As the red pigment, for example, the following may be used: C.I. Pigment Red 7, 9, 14, 41, 48:1, 48:2, 48:3, 48:4, 81:1, 81:2, 81:3, 97, 122, 123, 146, 149, 168, 177, 178, 179, 180, 184, 185, 187, 192, 200, 202, 208, 210, 215, 216, 217, 220, 223, 224, 226, 227, 228, 240, 242, 246, 254, 255, 264, 272, 279, or the like.

As the yellow pigment, for example, the following may be used: C.I. Pigment Yellow 1, 2, 3, 4, 5, 6, 10, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 144, 146, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, 214, or the like.

As the blue pigment, for example, C.I. Pigment Blue 15, 15:1, 15:2, 15:3, 15:4, 15:6, 16, 22, 60, 64, 80, or the like may be used. Among these, C.I. Pigment Blue 15:6 is preferably used.

As the purple pigment, for example, C.I. Pigment Violet 1, 19, 23, 27, 29, 30, 32, 37, 40, 42, 50, or the like may be used. Among these, C.I. Pigment Violet 23 is preferably used.

As the green pigment, for example, C.I. Pigment Green 1, 2, 4, 7, 8, 10, 13, 14, 15, 17, 18, 19, 26, 36, 45, 48, 50, 51, 54, 55, 58, or the like may be used. Among these, C.I. Pigment Green 58 that is a halogenated zinc phthalocyanine green pigment is preferably used.

(Color Material in Light-Shielding Layer)

A color material contained in the light-shielding layer or the matrix pattern is a color material that exhibits a light-shielding function by absorbing light in a visible light wavelength region. Examples of the light-shielding color material according to the embodiment include, for example, organic pigments, inorganic pigments, and dyes. As the inorganic pigment, for example, carbon black, titanium oxide, or the like may be used. As the dye, for example, an azo-based dye, an anthraquinone-based dye, a phthalocyanine-based dye, a quinone imine-based dye, a quinoline-based dye, a nitro-based dye, a carbonyl-based dye, a methine-based dye, or the like may be used. As the organic pigment, the organic pigments mentioned above may be adopted. In addition, the light-shielding components may be used alone or in combination of two or more kinds mixed in a proper ratio. Moreover, a resin may be coated on the surface of the color material so that a volume resistivity of the color material may be increased. Conversely, the volume resistivity of the color material may be decreased by increasing the content ratio of the color material with respect to the resin as a base member, and imparting slight conductivity to the color material. However, since the value of the volume resistivity of the light-shielding material is in the range of $1 \times 10^8$ to $1 \times 10^{15} \Omega \cdot cm$, this range is not a level that influences the resistivity of the transparent conductive film. Similarly, the relative dielectric constant of the light-shielding layer can be adjusted to be within the range of about 3 to 20 by the selection of the kind or the content ratio of the color material. The relative dielectric constants of the black matrix 10, the color filter layer 18, and the transparent resin layer 12 can be adjusted to be within the above-mentioned relative dielectric constant range according to the design condition and the liquid crystal drive condition of the liquid crystal display devices 1 and 16.

Fourth Embodiment

In this embodiment, a specific example of the liquid crystal display device 16 illustrated in FIG. 2 will be described. An array substrate 2 of the liquid crystal display device 16 includes a transparent substrate 40, a first electrode 7 electrically connected to an oxide semiconductor TFT (not illustrated), and a second electrode 6 arranged to have an insulating layer 53 between the first electrode 7 and the second electrode 6. Alignment sustaining layers 8 and 13 are formed on the surfaces of the array substrate 2 and a counter substrate 17 that are in contact with a liquid crystal layer 4. The alignment sustaining layers 8 and 13 are formed by giving a pre-tilt function to a photosensitive aligning film by a producing method along with the voltage application and the light irradiation. The alignment sustaining layers 8 and 13 are given a pre-tilt angle by applying a liquid crystal drive voltage to the first electrode 7, the second electrode 6, and a third electrode 11 and irradiating ultraviolet rays in a state in which the liquid crystals 4a to 4k are inclined as illustrated in FIG. 4. As illustrated in FIG. 4, the liquid crystals 4a to 4k incline in a direction in which the second electrode 6 protrudes from the first electrode 7, in the horizontal direction. Accordingly, the pre-tilt angle is formed in the direction in which the second electrode 6 protrudes from the first electrode 7 with respect to the direction in which the comb-teeth portion is arranged.

(Formation of Black Matrix 10)<

<Photoresist for Forming Black Matrix>

As the material of the light-shielding layer, a photoresist for forming black matrix is generated by using the following materials.

Carbon black dispersing liquid
Transparent resin (solid: 56.1% by mass)
Photopolymerizable monomer
Initiator
Solvent: propylene glycol monomethyl ether acetate, ethyl-3-ethoxypropionate
Leveling Agent By mixing and stirring these materials in the following composition ratio, the photoresist (a concentration of pigment in solid: 20%) for forming the black matrix is generated.

| | |
|---|---|
| Carbon black dispersing liquid | 3.0 parts by mass |
| Transparent resin | 1.4 parts by mass |
| Photopolymerizable monomer | 0.4 parts by mass |
| First photopolymerization initiator | 0.67 parts by mass |
| Second photopolymerization initiator | 0.17 parts by mass |
| Propylene glycol monomethyl ether acetate | 14 parts by mass |
| Ethyl-3-ethoxypropionate | 5.0 parts by mass |
| Leveling agent | 1.5 parts by mass |

<Black Matrix Forming Condition>

A resist for black matrix formation is spin-coated on a transparent substrate of a non-alkali glass and then dried to produce a coating film with a film thickness of 1.5 μm. The coating film is dried at 100° C. for 3 minutes, and then irradiation of 200 mJ/cm$^2$ is performed using a photomask for exposure and a ultra high pressure mercury light lamp as a light source.

Next, development is performed on the substrate for 60 seconds with a 2.5% sodium carbonate aqueous solution, the substrate is washed well after the development, drying the substrate is performed again, heat treatment is performed on the substrate at 230° C. for 60 minutes to cure the coating film, and finally a black matrix 10 is formed on the substrate. A pattern width of the black matrix 10 illustrated in FIG. 2 is, for example, about 16 μm. The plan view shape of the unit sub-pixel or the unit pixel of the black matrix may be, for example, a parallelogram.

(Formation of Counter Electrode 11)

The third electrode 11 of ITO with a film thickness of 0.14 μm is formed to cover the entire surface of the pattern of the black matrix 10 using a sputtering apparatus.

(Formation of Transparent Pattern 41)

A transparent pattern 41 which is parallel to the black matrix 10 is formed with a photography method at the center portion of the plane of the unit sub-pixel or the unit pixel (that is, the center portion of the open region of the black matrix 10) by using a photosensitive resin solution A to be described later, a photomask having an opening pattern corresponding to the transparent pattern 41. For example, when the open region is a parallelogram, the transparent pattern 41 is a state of the parallelogram. For example, the film thickness of the transparent pattern 41 is about 0.6 μm.

(Formation of Color Filters R, G, and B)

<Dispersing Liquid for Color Filter Formation>

The following pigments are used as organic pigments dispersed in the color filters R, G, and B.

Pigments for red: C.I. Pigment Red 254 and C.I. Pigment Red 177

Pigments for green: C.I. Pigment Green 58 and C.I. Pigment Green Yellow 150

Pigments for blue: C.I. Pigment Blue 15 and C.I. Pigment Violet 23

Red, green and blue dispersion liquids are generated using the above pigments.

<Red Dispersion Liquid>

| | |
|---|---|
| Red pigments: C.I. Pigment Red 254 | 18 parts by mass |
| Red pigments: C.I. Pigment Red 177 | 2 parts by mass |
| Acrylic varnish (solid: 20% by mass) | 108 parts by mass |

A mixture of the above composition is homogeneously stirred, then dispersed using glass beads by sand mill for 5 hours, and filtered through a filter of 5 μm, which produces a red dispersion liquid.

<Green Dispersion Liquid>

| | |
|---|---|
| Green pigment: C.I. Pigment Green 58 | 16 parts by mass |
| Green pigment: C.I. Pigment Green Yellow 150 | 8 parts by mass |
| Acrylic varnish (solid: 20 parts by mass) | 102 parts by mass |

A green dispersion liquid is produced by using the production method similar to that of the red dispersion liquid for a mixture of the above composition.

<Blue Dispersion Liquid>

| | |
|---|---|
| Blue pigments: C.I. Pigment Blue 15 | 50 parts by mass |
| Blue pigments: C.I. Pigment Violet 23 | 2 parts by mass |
| Dispersing agent | 6 parts by mass |
| Acrylic varnish (solid: 20% by mass) | 200 parts by mass |

A blue dispersion liquid is produced by using the production method similar to that of the red dispersion liquid for a mixture of the above composition.

TABLE 2

| Color resist | For red filter | For green filter | For blue filter |
|---|---|---|---|
| Pigment dispersion liquid | Red dispersion liquid | Green dispersion liquid | Blue dispersion liquid |
| (parts by mass) | 51 | 52 | 42 |
| Acrylic resin solution | 1 | 0 | 10 |
| Monomer | 4 | 4.8 | 5.6 |
| Photopolymerization initiator | 3.4 | 2.8 | 2 |
| Sensitizer | 0.4 | 0.2 | 0.2 |
| Organic solvent | 40.2 | 40.2 | 40.2 |
| Total | 100 | 100 | 100 |

The film thickness of each of the color filters R, G, and B after the exposure, development, and curing is set to about 2 μm.

(Formation of Transparent Resin Layer 12)<
<Synthesis of Resin A>

In a separable flask, 686 parts by mass of propylene glycol monomethyl ether acetate, 332 parts by mass of glycidyl methacrylate, and 6.6 parts by mass of azobisisobutyronitrile are added, and heated at 80° C. for 6 hours in a nitrogen ambient, thereby producing a resin solution.

Next, 168 parts by mass of acrylic acid, 0.05 parts by mass of methoquinone, and 0.5 parts by mass of triphenylphosphine are added to the resin solution, and the mixture is heated at 100° C. for 24 hours while blowing air thereto, thereby producing an acrylic acid-added resin solution.

In addition, 186 parts by mass of tetrahydrophthalic anhydride is added to the produced acrylic acid-added resin solution, and the mixture is heated at 70° C. for 10 hours, thereby producing Resin A solution.

<Preparation of Photoresist Resin Solution A>

Photosensitive resin solution A of negative type is prepared by using the following composition.

| | |
|---|---|
| Resin A | 200 part by mass |
| Photopolymerizable monomer | |
| Dipentaerythritol hexaacrylate | 100 parts by mass |
| Photopolymerization initiator | 100 parts by mass |
| Solvent (propylene glycol monomethyl ether acetate) | 450 parts by mass |

By using the above photosensitive resin solution A, a photomask with a pattern of a concave portion, and photolithography method, as illustrated in FIG. 2, the transparent layer 12 with a linear pattern of the concave portion 15 having a width of 8 μm and a depth of 0.5 μm is formed.

(Formation of Alignment Sustaining Layer 13)

The formation of the alignment sustaining layer 13 on the counter substrate 17 will be described later.

(Configuration of Oxide Semiconductor TFT and Array Substrate 2)

The array substrate 2 includes insulating layers 51 and 52, the second electrode 6, an insulating layer 53, the first electrode 7, and the alignment sustaining layer 8 in this order on the transparent substrate 40 which is a glass substrate as illustrated in FIG. 2. Although not illustrated, the array substrate 2 further includes an active element 19 for applying the liquid crystal drive voltage to the first electrode 7, and a gate line and a source line electrically connected to the active element 19.

The active element 19 has, for example, a bottom gate type top contact etching stopper structure.

In manufacturing the active element 19, first of all, an ITO thin film is formed to 140 nm by a DC magnetron sputtering method. Next, the ITO thin film is patterned into desired shapes at positions of respective unit sub-pixels or respective unit pixels of the color filters R, G, and B to form the gate electrodes and electrodes of the auxiliary capacitors. In addition, a $SiH_X$ thin film with 350 nm is formed on the resultant structure by using a plasma CVD method, and $SiH_4$, $NH_3$, and $H_2$ as a source gas, and it is used as a gate insulation film which is a transparent insulating layer. In addition, for forming a channel layer, an amorphous In—Ga—Zn—O thin film is formed to have a thickness of 40 nm with a DC sputtering technique by using an $InGaZnO_4$ target as a channel layer, and is then patterned into a desired shape. As a result, a transparent channel layer is formed. In addition, a SiON thin film is formed by using a $Si_3H_4$ target and an RF sputtering technique while introducing Ar and $O_2$, and is then patterned into a desired shape. As a result, a channel protection film is formed. In addition, an ITO thin film is formed to have a thickness of 140 nm with a DC magnetron sputtering method, and is then patterned into a desired shape. As a result, source and drain electrodes are formed.

(Configuration and Manufacturing Method of Alignment Sustaining Layers 8 and 13)

The alignment sustaining layers 8 and 13 (alignment film given a pre-tilt angle) are formed on the surfaces of the array substrate 2 and the counter substrate 17, respectively.

In each of the array substrate 2 and the counter substrate 17, a vertical aligning agent which is a mixture of a photosensitive polyorganosiloxane and a polyamic acid that are dissolved in a mixture solvent of n-methyl-2-pyrrolidone and butyl cellosove in advance is printed, and as a result a vertical alignment film is formed. After the printing, the film is dried at 180° C., and the film thickness of the vertical alignment film becomes, for example, about 60 nm.

An epoxy adhesive containing spherical spacers having a size of 3.6 μm is printed on the counter substrate 17 as a seal portion of the liquid crystal, liquid crystals with negative dielectric anisotropy are dropped at a center portion of the counter substrate 17, and the array substrate is air-tightly bonded to the counter substrate. As a result, a liquid crystal cell is formed. The liquid crystal cell is heated to 150° C. once so that the liquid crystal is isotropic.

Next, while an alternating-current (AC) voltage is applied to the first electrode 7 of the array substrate 2, unpolarized ultraviolet rays are irradiated from the glass surface of the transparent substrate 40 and from the direction (the vertical direction to the glass surface) of a normal line of the glass surface in a dose of 2000 $J/m^2$. In addition, the first electrode 6 and the third electrode 11 are grounded to 0 V.

Various pre-tilt angles are given to the alignment film by using a combination of the value of the drive voltage, the applying method of the drive voltage, the irradiation amount of the ultraviolet rays, and the polarized ultraviolet rays incident in an oblique direction, so that the alignment sustaining layers 8 and 13 can be formed. In this embodiment, the pre-tilt angle of the alignment sustaining layer 8 on the array substrate 2 is roughly in the range of from 0.4 to 0.9°, and inclines in the direction in which the second electrode 6 protrudes from the first electrode 7 in terms of the horizontal direction.

The polarizing plates are bonded to both sides of the liquid crystal cell which has undergone the alignment process and thus the liquid crystal display device 16 is formed. In the liquid crystal display device 16 according to this embodiment, there is nearly no optical leakages in the normally black state, that is, at the time when no liquid crystal drive voltage is applied, and therefore an excellent black-state display can be realized.

Moreover, in the liquid crystal display device 16 according to the present embodiment, the oblique electric field drive method using the first electrode 7, the second electrode 6, and the third electrode 11 is adopted. Accordingly, even with a minute pre-tile angle of the alignment sustaining layers 8 and 13, it is possible to realize a good halftone display at a low voltage.

Fifth Embodiment

In this embodiment, a modification of the liquid crystal display device 16 of FIG. 2 will be described.

Figure 13:
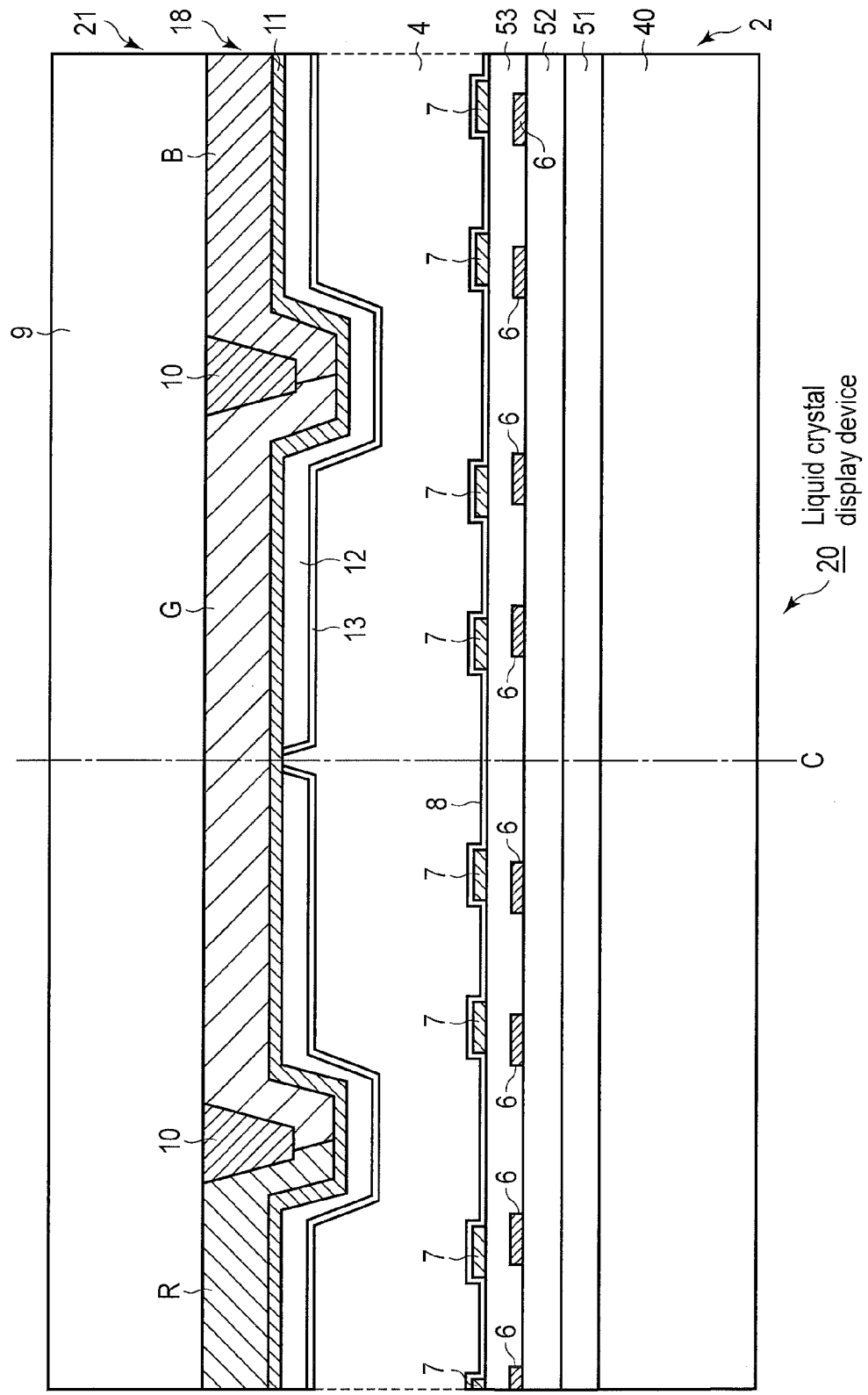
FIG. 13 is a partial cross-sectional view illustrating an example of a configuration of a liquid crystal display device according to a fifth embodiment.

FIG. 13 is a partial cross-sectional view illustrating an example of a configuration of a liquid crystal display device according to this embodiment.

In a counter substrate 21 of a liquid crystal display device 20, the configuration order of a color filter layer 18 and a third electrode 11 are replaced with the counter substrate 17 of FIG. 2. Specifically, the counter substrate 21 according to this embodiment is obtained by forming a black matrix 10 on the surface of a transparent substrate 9, and forming the color filter layer 18, the third electrode 11, a transparent resin layer 12, and an alignment sustaining layer 13. Materials used for the counter substrate 21 and process conditions may be similar to those of the counter substrate 18 illustrated in FIG. 2.

Sixth Embodiment

In this embodiment, another modification of the liquid crystal display device 16 of FIG. 2 will be described.

Figure 14:
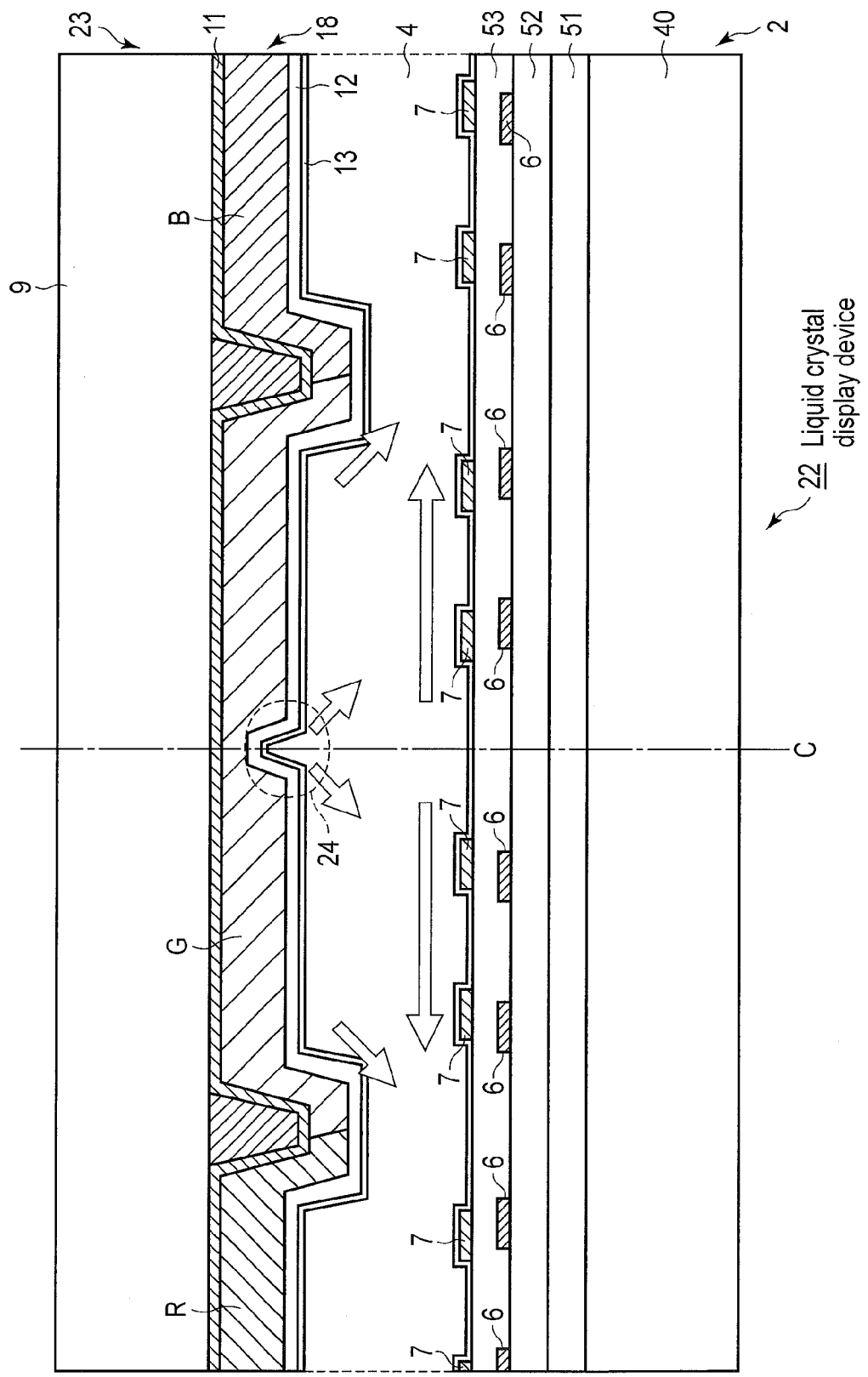
FIG. 14 is a partial cross-sectional view illustrating an example of a configuration of a liquid crystal display device according to a sixth embodiment.

FIG. 14 is a partial cross-sectional view that illustrates one example of a configuration of a liquid crystal display device according to this embodiment.

A counter substrate 23 of a liquid crystal display device 22 is different from the counter substrate 17 of FIG. 2 where the concave portion 15 is formed at the central line portion of the transparent resin layer 12 but the concave portion 15 is not formed at the central line portion of the color filtering layer 18 in the point that a concave portion 24 is formed at a central line portion of a color filter layer 18.

The concave portion 24 can be formed with the same process as the process for forming the concave portion 15 of the counter substrate 17 of FIG. 2. For example, the concave portion 24 is formed at a center portion of an open region of the color filter layer 18 (that is, a central line portion of a unit sub-pixel or a unit pixel pattern) in a longitudinal direction by using a photomask in which linear patterns having different transmittances are formed in halftone.

In the manufacturing method of the counter substrate 23 according to this embodiment, the photolithography process for the transparent resin layer 12 which is necessary in manufacture of the counter substrate 17 of FIG. 2 may not be performed. That is, according to this embodiment, a transparent resin layer 12 is formed using a thermosetting resin material and thus can be formed only with coating and thermal curing processes. Since the concave portion 24 is formed in the color filter layer 18, the transparent resin layer 12 and an alignment sustaining layer 13 may have a thickness to the extent where the concave portion 24 in the color filter layer 18 is not filled.

Seventh Embodiment

In this embodiment, the description concerning the liquid crystal display device 1 of FIG. 1 is supplemented.

Regarding the counter substrate 3 of the liquid crystal display device 1 of FIG. 1, a process of forming the color filter layer 18 of the counter substrate 17 of the liquid crystal display device 16 of FIG. 2 is not performed.

For example, the counter substrate 17 may be used in the liquid crystal display device for a small portable apparatus for a monochrome display or in the liquid crystal display device for a color display based on a field sequential method.

In the liquid crystal display device 1, the liquid crystal cell is formed using the similar process for forming the liquid crystal display device 16 of FIG. 2, that is, by forming the array substrate 2, the counter substrate 3, and the liquid crystal layer 4 with negative dielectric anisotropy except for the process of forming the color filter. On the counter substrate 3 side, a vertical alignment film is formed by printing a vertical aligning agent of polyimide which is dissolved in a mixture solvent of n-methyl-2-pyrrolidone and butyl cellosolve in advance. On the array substrate 2 side, a vertical alignment film is formed by printing a vertical aligning agent which is a mixture of photosensitive polyorganosiloxane and polyamic acid.

In the liquid crystal display device 1 of FIG. 1, the liquid crystal cell is formed by the same process as the liquid crystal display device 16 of FIG. 2, ultraviolet rays are irradiated to the liquid crystal in the presence of electric field to give a pre-tilt angle to the alignment film on the array substrate 2. In this way, the alignment sustaining layer 8 is formed. In this embodiment, the alignment film of the counter substrate 3 is assumed not to be photosensitive. Therefore, in the counter electrode 3, the vertical alignment film without a pre-tilt angle being given becomes the alignment sustaining layer 13. The shape of the open region of the black matrix 10 of FIG. 1 can be a pattern of a "<" state illustrated in FIG. 8 for example.

Eighth Embodiment

In this embodiment, a modification of the liquid crystal display device 1 of FIG. 1 is described.

FIG. 15 is a partial cross-sectional view that illustrates an example of a configuration of a liquid crystal display device according to this embodiment.

A counter substrate 26 of a liquid crystal display device 25 does not include a color filter layer 18. For example, the counter substrate 26 may be used in the liquid crystal display device for a small portable apparatus for a monochrome display and the liquid crystal display device for a color display based on a field sequential method.

A concave portion 15 is not formed in a transparent resin layer 12 of the counter substrate 26, and a slit 27 (linear opening without a transparent conductive film) is formed at a central line portion of a third electrode 11 instead. After the third electrode 11 is formed, the slit 27 is formed at the central line portion of each of the unit sub-pixels or each of the unit pixels by photolithography using etching technique. The formation of an alignment sustaining layer 13 is similar to the case of FIG. 1.

In this embodiment, although the concave portion 15 is not provided, the same operational effect as the first embodiment can be obtained by forming the slit 27.

Ninth Embodiment

In this embodiment, liquid crystal display devices including counter substrates 3, 17, 21, 23, and 26 according to the first to eighth embodiments will be described by using a transflective liquid crystal display device that uses a reflective polarizing plate. The counter substrates 3, 17, 21, 23, and 26 according to the first to eighth embodiments can be applied to other liquid crystal display devices than the transflective liquid crystal display device.

Figure 16:
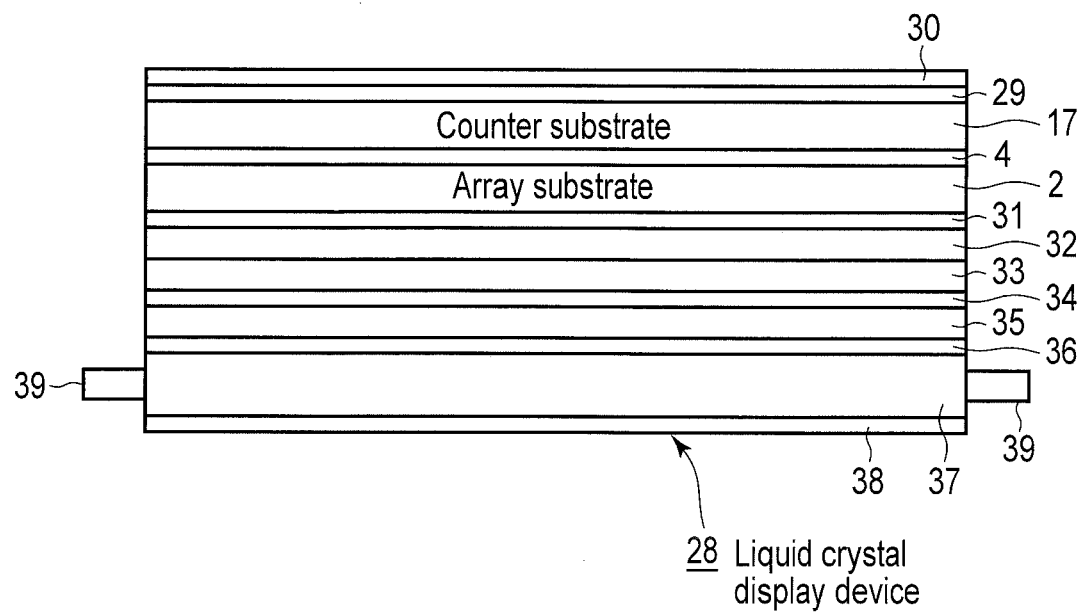
FIG. 16 is a partial cross-sectional view illustrating an example of a configuration of a transflective liquid crystal display device using a reflective polarizing plate according to a ninth embodiment.

FIG. 16 is a partial cross-sectional view that illustrates an example of a configuration of a transflective liquid crystal display device that uses a reflective polarizing plate according to this embodiment. For example, the reflective polarizing plate described in JP 4177398 can be used as the reflective polarizing plate.

Although a liquid crystal display device 28 illustrated in FIG. 16 includes the counter substrate 17 of FIG. 2, it may use different counter substrates 3, 21, 23, and 26 according to the respective embodiments described above.

Alignment sustaining layers 8 and 13 formed on surfaces of an array substrate 2 and the counter substrate 17 that are in contact with a liquid crystal layer 4 are vertical alignment films formed by printing a vertical aligning agent which is a mixture of photosensitive polyorganosiloxane and polyamic acid. As described above, a liquid crystal drive voltage is applied to the alignment sustaining layers 8 and 13 to perform optical alignment process.

The liquid crystal display device 28 includes the array substrate 2 and the counter substrate 17 that face each other, and includes the liquid crystal layer 4 with negative dielectric anisotropy interposed between the array substrate 2 and the counter substrate 17.

Of two surfaces of the counter substrate 17, an optical compensation layer 29 and a polarizing plate 30 are disposed on the surface opposite to the liquid crystal layer 4.

Of two surfaces of the array substrate 2, on the surface opposite to the liquid crystal layer 4, a polarizing plate 31, an optical diffusion layer 32, a reflective polarizing plate 33, an optical compensation layer 34, a prism sheet 35, an optical diffusion layer 36, a light guiding plate 37, and an optical reflecting plate 38 are sequentially provided. For example, the light guiding plate 37 may include a light source 39 such as an LED.

It is preferable that the light source 39 be RGB individual light-emitting elements, but a false white LED may be used. Moreover, a cold cathode tube or a fluorescent lamp may be used instead of the LED. When the RGB individual light-emitting elements as the light source 39 are employed, the luminous intensity can be adjusted individually for each color. Accordingly, it is possible to display an optimum color. Moreover, the RGB individual light-emitting elements may be applied to the display of a stereographic image or the control of a viewing angle. A local dimming method which is a technology for improving the contrast by adjusting the luminance of a backlight based on area control of a display screen can be easily applied to the LED light source. In this embodiment, the image quality can be improved by using both the normal display area and the dynamic display area. In the local dimming method, the RGB individual light-emitting elements are not applied to the edge light system as in FIG. 16 but applied to the direct backlight system in which the light-emitting elements are arranged on the back surface of the liquid crystal display device 28. It allows for fine area control, resulting in a high quality display. The liquid crystal display device 28 according to this embodiment uses the field sequential method which causes the RGB individual light-emitting elements to synchronize the operation of the liquid crystal to be displayed in color.

The plan view shape of the unit sub-pixel or the unit pixel of the liquid crystal display device 28 according to this embodiment can be divided into two areas that are line-symmetrical or four areas that are point-symmetrical. As illustrated in FIG. 10, two or more active elements 19 and two more first electrodes 7 that are electrically connected to the active elements 19 may be provided for each unit sub-pixel or each unit pixel. The respective active elements 19 are driven by different voltages. With use of this driving method, viewing angle control and stereoscopic image display can be effectively performed.

In the manufacturing process of the liquid crystal display devices 1, 16, 20, 22, 25, and 28 according to the embodiments, in a state in which a alternating current voltage is applied to the first electrode 7 and the second electrode 6 and the third electrode 11 are commonly grounded, ultraviolet rays are irradiated, so that the alignment sustaining layers 8 and 13 are given a pre-tilt angle. The method of applying voltages, the amount of irradiation, and the wavelength of exposure can be adjusted arbitrarily according to various dimensions of the liquid crystal display devices 1, 16, 20, 22, 25, and 28, the material characteristics of used liquid crystal, the alignment film used for forming the alignment sustaining layers 8 and 13, and the like. For example, an asymmetric square wave of the alternating voltage may be used. As for the application of liquid crystal drive voltage, any one of the first electrode 7, the second electrode 6, and the third electrode 11 may be floated. The common potential may be shifted to a plus voltage or a minus voltage. That is, various adjustments are possible.

Each of the above-mentioned embodiments can be applied with changes and modifications without departing from the spirit of the invention.

What is claimed is:

1. A liquid crystal display device, comprising an array substrate and a counter substrate that face each other with a liquid crystal layer therebetween,
    wherein the array substrate includes:
    a first electrode having a comb-teeth shape and being electrically connected with an active element;
    a second electrode having a comb-teeth shape, facing the first electrode with an insulating layer therebetween, and including a protruding portion protruding from the first electrode in a direction where comb teeth are arranged; and
    an alignment sustaining layer formed above a surface of the array substrate being in contact with the liquid crystal layer and giving liquid crystals a pre-tilt to a direction in which the second electrode protrudes from the first electrode, in a direction in which the comb teeth are arranged, and
    wherein the counter substrate includes a third electrode with a voltage being applied between the third electrode and the first electrode during liquid crystal driving.

2. The liquid crystal display device according to claim 1, wherein the counter substrate includes convex portions at two side portions, facing each other, of a polygonal shape of a unit sub-pixel or a unit pixel, and a concave portion at a center portion between the two side portions of the polygonal shape of the unit sub-pixel or the unit pixel, on a surface side of the counter substrate being in contact with the liquid crystal layer.

3. The liquid crystal display device according to claim 1, wherein the protruding direction is two directions opposing each other from the center portion of the unit sub-pixel or the unit pixel in the direction of the comb teeth arrangement.

4. The liquid crystal display device according to claim 1, wherein in the unit sub-pixel or the unit pixel, the direction in which the comb teeth are arranged is a plurality of directions.

5. The liquid crystal display device according to claim 1, wherein the first electrode has at least one flaw line on a surface thereof on the liquid crystal layer side.

6. The liquid crystal display device according to claim 5, wherein a longitudinal direction of the flaw line is perpendicular or parallel to the direction in which the second electrode protrudes from the first electrode.

7. The liquid crystal display device according to claim 1, wherein the liquid crystal layer contains liquid crystals vertically aligned.

8. The liquid crystal display device according to claim 1, wherein the active element is a thin film transistor including a transparent source electrode, a transparent drain electrode, a transparent gate electrode, a transparent insulating layer, and a transparent channel layer containing one or more kinds of metal oxides.

9. The liquid crystal display device according to claim 1, wherein a plan view shape of the unit sub-pixel or the unit pixel is a polygonal pattern where opposing sides are parallel to each other.

10. The liquid crystal display device according to claim 1, wherein the third electrode is formed of a transparent conductive film and has a linear slit or a cross-shape slit at the center portion of the unit sub-pixel or the unit pixel.

11. The liquid crystal display device according to claim 1, wherein the counter substrate further includes a red filter, a green filter, and a blue filter.

12. The liquid crystal display device according to claim 1, wherein the green filter contains haloganated zinc phthalocyanine green pigments.

13. A method of manufacturing a liquid crystal display device including an array substrate, and a counter substrate with a liquid crystal layer interposed therebetween, in which the array substrate includes: a first electrode having a comb-teeth shape and being electrically connected to an active element; a second electrode facing the first electrode with an insulating layer therebetween; an alignment film formed above a surface of the array substrate being in contact with the liquid crystal layer, in which the counter electrode includes a third electrode with a voltage being applied between the third electrode and the first electrode during liquid crystal driving, the method comprising:
    applying a voltage to at least one of the first to third electrodes;

irradiating light from a surface of the array substrate that is not in contact with the liquid crystal layer; and generating an alignment sustaining layer that gives liquid crystals a pre-tilt to a direction in which the second electrode protrudes from the first electrode, in a direction in which comb teeth of the first electrode are arranged, with the alignment film.

14. The method of manufacturing a liquid crystal display device according to claim 13, wherein the first to third electrodes are formed of a transparent conductive film.

15. The method of manufacturing a liquid crystal display device according to claim 13, wherein the active element is a thin film transistor of an oxide semiconductor that uses a transparent complex metal-oxide in a visible ray region.

16. The method of manufacturing a liquid crystal display device according to claim 13, wherein the second electrode has a comb-teeth shape and includes a protrusion portion that protrudes from the first electrode in a direction in which comb teeth are arranged.

17. The method of manufacturing a liquid crystal display device according to claim 13, wherein the liquid crystal layer contains liquid crystals with negative dielectric anisotrophy.

* * * * *